United States Patent
May et al.

(10) Patent No.: US 6,199,116 B1
(45) Date of Patent: *Mar. 6, 2001

(54) METHOD AND SYSTEM FOR MANAGING DATA WHILE SHARING APPLICATION PROGRAMS

(75) Inventors: Philip Jonathan May, Hertfordshire; Christopher J. Mairs; Conor M. Foley, both of London, all of (GB)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/653,765

(22) Filed: May 24, 1996

(51) Int. Cl.[7] ............................... G06F 9/00; G06F 9/46; G06F 15/16

(52) U.S. Cl. ........................................... 709/310; 709/204

(58) Field of Search ....................... 395/200.34; 707/530; 345/330; 700/204–207; 709/310.332

(56) References Cited

U.S. PATENT DOCUMENTS

| | | | |
|---|---|---|---|
| 4,882,687 | 11/1989 | Gordon | 364/518 |
| 5,206,934 | 4/1993 | Naef, III | 395/200 |
| 5,210,825 | 5/1993 | Kavaler | 395/147 |
| 5,255,361 | 10/1993 | Callaway et al. | 395/162 |

(List continued on next page.)

OTHER PUBLICATIONS

Schroeder, Erica, "PictureTel Plans Low–Cost Video App Sharing," *PCWEEK*, vol. 11, No. 25, Jun. 27, 1994, pp. 1 and 171.

Schroeder, Erica, "Creative Brings Mac Package to Window," *PCWEEK*, vol. 11, No. 25, Jun. 27, 1994, pp. 83 and 88.

"Intel ProShare™ Personal Conferencing Software," Intel Corporation, 1994, pp. 25–31.

Trevor et al., 'The Use of Adapters to Support Cooperative Sharing', ACM Digital Library, pp. 219–230, 1994.*

(List continued on next page.)

*Primary Examiner*—Majid Banankhah
*Assistant Examiner*—P. G. Caldwell
(74) *Attorney, Agent, or Firm*—Leydig, Voit & Mayer Ltd.

(57) ABSTRACT

A method and system for managing data (i.e., objects) that are shared by multiple instances of a shared application program. A shared application program is an application program that is executing simultaneously on multiple computers and that has a copy of data that is being shared by each instance of the application program. In particular, each computer maintains a copy of the shared data. When an instance of the application program modifies the shared data, the modifications are sent to the other computers. Each of these other computers stores the data in its copy of the shared data, and each instance of the application program updates its user interface to reflect the modifications to the shared data. Thus, the users of the shared application program can cooperatively modify and view the shared data. For example, multiple users can be executing a word processing program on their computer and sharing a common document. As one user changes the document, the word processing program updates its copy of the shared data. The changes are then transmitted to the other computers so that their copy of the shared data can be updated. In particular, an object management (OM) system is provided that enables shared application programs to manage their copy of the shared data. Each computer has a copy of the OM system. The OM system, under the direction of the shared application program, manages the adding, deleting, and modifying of the shared data. The OM system also controls the transmitting of modifications to the copy of the shared data to the other computers.

10 Claims, 22 Drawing Sheets

U.S. PATENT DOCUMENTS

| | | | |
|---|---|---|---|
| 5,408,600 | | 4/1995 | Garfinkel et al. .................... 395/153 |
| 5,452,299 | * | 9/1995 | Thessin et al. ........................ 370/62 |
| 5,565,886 | | 10/1996 | Gibson ................................ 345/136 |
| 5,583,993 | * | 12/1996 | Foster et al. . |
| 5,621,894 | * | 4/1997 | Menezes et al. . |
| 5,644,715 | * | 7/1997 | Baugher . |
| 5,673,394 | * | 9/1997 | Fenwick et al. . |
| 5,689,641 | * | 11/1997 | Ludwig et al. . |
| 5,717,863 | * | 2/1998 | Adamson et al. .............. 395/200.34 |
| 5,717,879 | * | 2/1998 | Moran et al. ........................ 395/339 |
| 5,724,508 | * | 3/1998 | Harple, Jr. et al. ............. 709/200.04 |
| 5,752,254 | * | 5/1998 | Sakairi ................................ 707/530 |
| 5,948,022 | * | 9/1999 | Carleton et al. ...................... 700/204 |
| 5,973,724 | * | 10/1999 | Riddle . |
| 5,995,096 | * | 11/1999 | Kitahara et al. .................... 345/330 |

OTHER PUBLICATIONS

Ishii et al, Integration of interpersonal Space & Shared Workspace Clear Board Design and Experiments ACM Transactions on Information Systems vol. 11, No. 4, pp. 349–375, Oct. 1993.*

Munson et al. 'A Concurrency Control Framework for Collaborative Systems', ACM Digital Library pp. 278–287, 1996.*

* cited by examiner

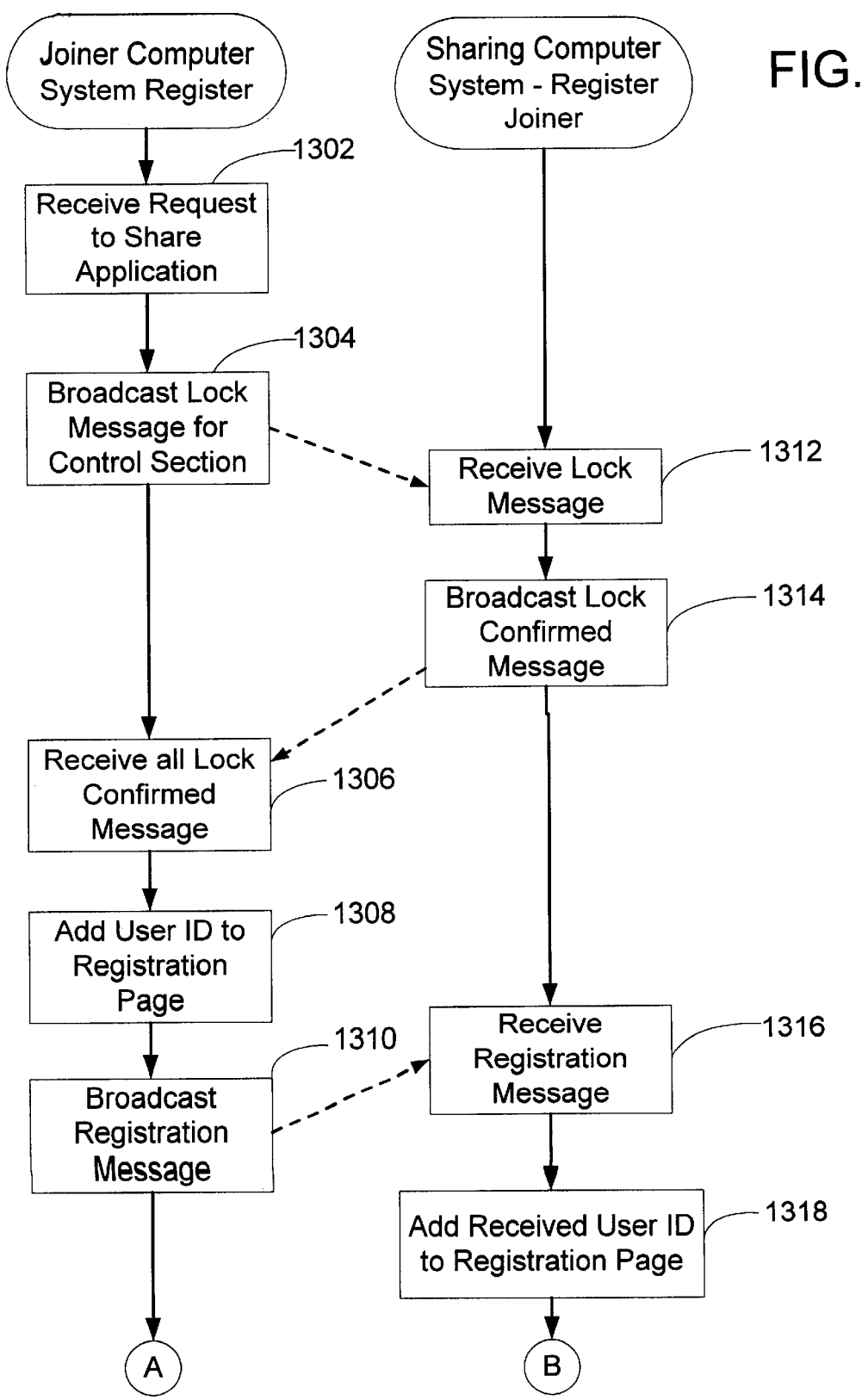

METHOD AND SYSTEM FOR MANAGING DATA WHILE SHARING APPLICATION PROGRAMS

TECHNICAL FIELD

The present invention relates generally to a computer method and system for sharing application programs, and, more specifically, to a method and system for managing data while sharing application programs.

BACKGROUND OF THE INVENTION

The modem workplace is increasingly reliant on the use of networks. A network is a group of computers that are connected by communications facilities. A network enables the transfer of information in electronic form between computers. Typically, each of the computers has local application programs, such as a word processing program, that can be executed at that computer. These application programs may access files that contain data, such as a word processing document. The files can be transferred from one computer to another using the network. Thus, it is possible for a user at one computer to modify the data in a file and then transfer the file to another computer so that a user at that other computer can view and modify the data in the file.

Some computers allow a user to execute an application program at one computer and have the screen output of that application program be displayed at one other computer. In this way, two users at distant locations can follow the execution of the application program. Indeed, some computers even allow the user at the other computer to input data that is sent to the executing application. For example, the two users can simultaneously see at their computers the contents of a word processing document as it is being modified, and both can participate in modifying the word processing document. Such use of an application program is known as "application sharing." To share an application program, each computer receives the output of the application program (i.e., application output) for display. Each computer then stores this application output in a data pool at that computer. At each computer that is sharing the application program, the data pool contains the same data and is referred to as a "shared data pool." The shared data pool stores data for an application program. Either of the users at the computers may provide input to the application program. The application program processes the input and stores the output in the shared data pool. The application data from the shared data pool is transmitted to each computer. Then each application program at each computer displays the received data from the shared data pool at that computer.

In a typical network of computers using a shared data pool, one of the computers (i.e., the guard computer) is designated to control access to the shared data pool. For one of the computers in the network to modify the shared data pool, that computer sends an indication to the guard computer indicating the modification. The guard computer modifies the shared data pool and then sends indications to the computers which are using that shared data pool, indicating the modification. In this manner, each computer receives the modifications to the shared data pool. It would be useful for each computer to have direct access to the shared data pool independent of each other computer.

Additionally, it would be useful to allow a new computer to join in using the shared data pool. In a typical network of computers, when a new computer joins in using the shared data pool, that new computer notifies the guard computer that it is joining. Then, the guard computer provides the new computer with the data in the shared data pool. While the guard computer is providing the new computer with the data, the guard computer is not able to process modifications to the shared data pool. Therefore, there is a delay in the guard computer processing modifications to the shared data pool indicated by other computers. It would be useful if other computers could continue to modify the shared data pool while a new computer is receiving data.

SUMMARY OF THE INVENTION

The present invention provides a method and system for managing data shared by multiple instances of a shared application program. A shared application program has instances executing simultaneously on multiple computers and has a copy of data that is being shared by each instance of the application program. Each computer maintains a copy of the shared data. When an instance of the shared application program modifies the shared data, the modifications are sent to the other computers. Each of these other computers stores the data in its copy of the shared data. In addition, each instance of the application program at these computers updates its user interface to reflect the modifications to the shared data. An object management (OM) system provides services through which shared application programs can manage the shared data. In particular, each computer has a copy of the OM system. The OM system, under the direction of the shared application program, manages the adding, deleting, and modifying of the shared data. The OM system also controls the transmitting of modifications to the copy of the shared data to the other computers.

In one aspect of the present invention, an application program is shared among a plurality of computers. Each computer executes an instance of the application program, and each instance of the application program has application data. Each computer also has a connection to each other computer, has an object management system for synchronizing the application data, and has a display on which the application data is displayed. At each computer, under control of the instance of the application program, an action to be performed on the application data is received from a user. Then, an action indication is transmitted from the instance of the application program to the object management system at that computer. The action indication indicates the received action. Under control of the object management system, the transmitted action indication is received from the instance of the application program. The received action indication is broadcast by the object management system to each other object management system at each other connected computer. Then, the object management system performs the action indicated by the received action indication on the application data. The object management system also notifies the instance of the application program that the action was performed on the application data. Under control of the instance of the application program, the notification is received from the object management system. Then the application program updates the display based on the application data on which the action was performed.

At each connected computer, under control of the object management system at that computer, the broadcast action indication is received from the other computer. Then the object management system performs the action indicated by the received action indication on the application data. The object management system also notifies the instance of the application program at that computer that the action was performed on the application data. Under control of the instance of the application program, the notification from the object management system is received. Then the instance of the application program updates the display based on the application data on which the action was performed.

In another aspect of the present invention, a new computer joins in sharing an application program with a plurality of other computers. Each computer has a connection to each other computer. Each computer that is sharing the application program has an instance of the application program and has a synchronized data area containing data output by the instance of the application program. Under control of the new computer, a joint message is broadcast to the other computers indicating that the new computer is to share the application program. The new computer then receives from each other computer a node identification that identifies that computer. The new computer selects one of the computers for which a node identification has been received. Then the new computer sends a request to the selected computer for a copy of the data in the synchronized data area. Upon receiving the copy of the data from the selected computer, the new computer generates a display based on the received copy of the data so that the new computer joins in the sharing of the application program.

BRIEF DESCRIPTION OF THE DRAWINGS

FIGS. 13A and 13B illustrate an overview flow diagram of the register joiner routine.

DETAILED DESCRIPTION OF THE INVENTION

1. Overview
2. Shared Data Pool
3. Establishing a Call
4. Object Management System
4.1 Creating a Control Section
4.2 Creating an Application Section
4.3 Joiner Computer
4.4 Operator Messages 1. Overview The present invention provides a method and system for managing data (i.e., objects) that are shared by multiple instances of a shared application program. A shared application program is an application program that is executing simultaneously on multiple computers and that has a copy of data that is being shared by each instance of the application program. Each computer maintains a copy of the shared data. When an instance of the application program modifies the shared data, the modifications are sent to the other computers. These other computers store the data in their copies of the shared data, and the instances of the application program update their user interfaces to reflect the modifications to the shared data. Thus, the users of the shared application program can cooperatively modify and view the shared data. For example, multiple users can be executing a word processing program on their computer and sharing a common document. As one user changes the document, the word processing program updates its copy of the shared data. The changes are then transmitted to the other computers so that their shared data can be updated.

A preferred object management (OM) system provides services through which shared application programs can manage their shared data. Each computer has a copy of the OM system. The OM system, under the direction of the shared application program, manages the adding, deleting, and modifying of the shared data. The OM system also controls the transmitting of modifications to the copy of the shared data to the other computers.

In a preferred embodiment, the OM system manages shared data for multiple shared application programs. For example, the users may be sharing both a word processing document and a spreadsheet document. The OM system stores the data in a shared data pool. The shared data pool contains application output (i.e., objects) shared by the group of computers. In particular, the shared data pool is partitioned into sections; one section is a control section and every other section is an application section ("a synchronized data area"). Each application section corresponds to an application program. The output of a shared application program is stored in the corresponding application section of the shared data pool.

Figure 1:
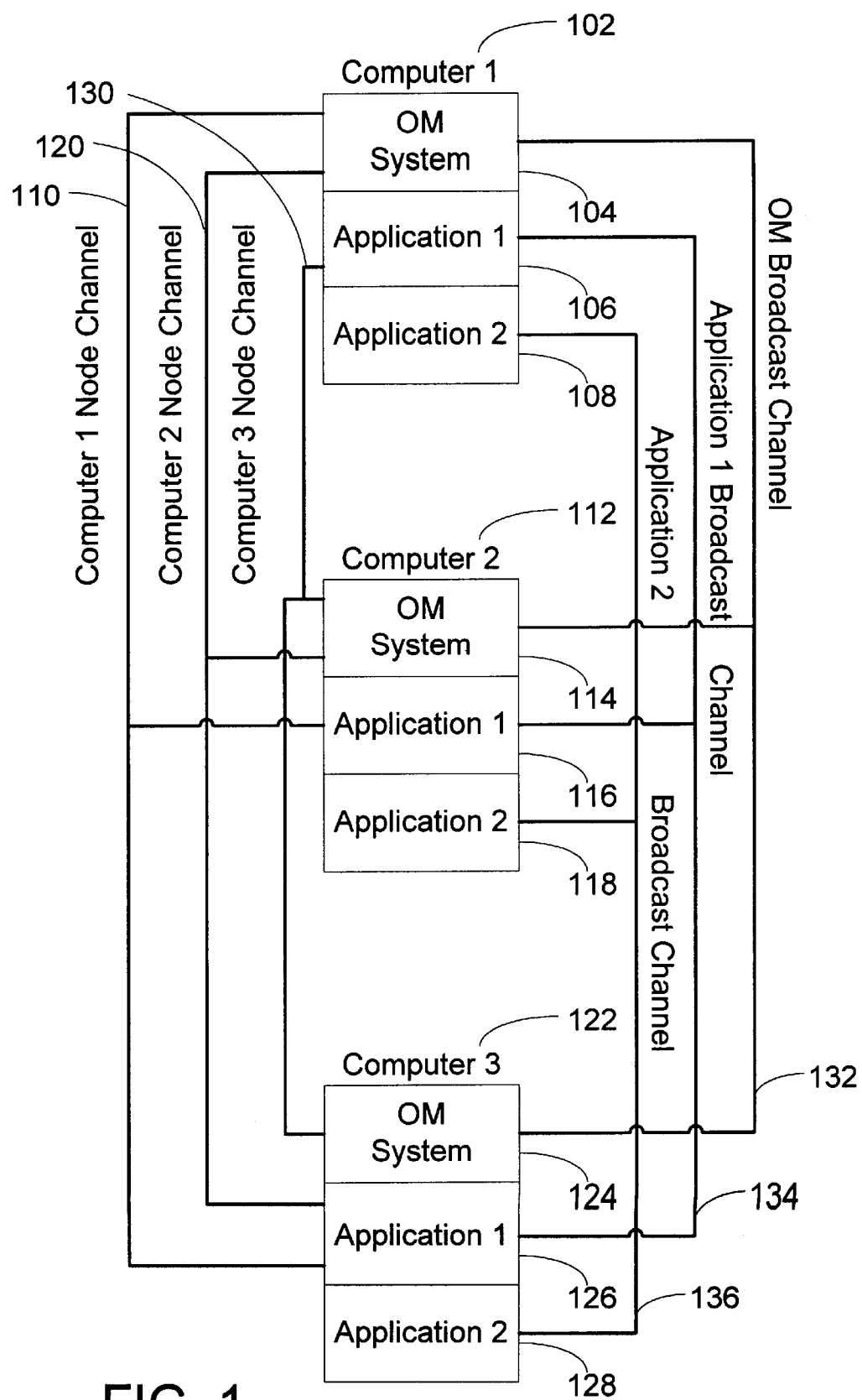
FIG. 1 illustrates the channels that the computers use for transmitting messages.

The computers communicate with each other by either transmitting messages to all of the computers (i.e., broadcasting messages) or transmitting messages to a particular computer (i.e., sending messages) over channels of the network. FIG. 1 illustrates the channels that the computers use for transmitting messages. In FIG. 1, Computer1 102, Computer2 112, and Computer3 122 are connected through a network. Each computer has an OM system, a copy of Application1, and a copy of Application2. The OM systems are assigned an OM broadcast channel 132 over which the OM systems broadcast data that is not specific to an application program. Each application program is also assigned a separate application broadcast channel. For example, Application1 is assigned application broadcast channel 134, and Application2 is assigned application broadcast channel 136. While sharing a particular application program, OM systems broadcast messages for that application program on the assigned channel. Moreover, each computer is assigned a node channel, which is used by an OM system to transmit messages to a particular computer. For example, Computer1 is assigned node channel 110, Computer2 is assigned node channel 120, and Computer3 is assigned node channel 130.

To modify an object (e.g., a display bitmap) in the shared data pool, the application program forwards an operator message to its OM system indicating an action to be performed on a specified object. The actions include adding an object to the shared data pool, updating an object, replacing an object, moving an object, or deleting an object. Application programs at each computer can perform an action on any object in their corresponding application sections in the shared data pool. Therefore, an OM system of a computer can receive multiple operator messages from OM systems of other computers. Moreover, the OM system can receive multiple operator messages from different application programs at the OM system's computer. Upon receiving an operator message from an application program, the OM system processes the operator message. Then, the OM system broadcasts the operator message that has been received from the application program to the OM systems of other computers on the application channel assigned to that application program. The OM system also forwards an event (i.e., action indication) to the application program indicating the action that has been performed (e.g., an object has been added).

The OM systems of the other computers receive the operator message and process the operator message. Because each operator message includes an indication of an application section, the OM system can determine which application section to modify based on the operator message. These OM systems then forward an event to the appropriate application program at their computers indicating the action that was performed. In this manner, the OM systems maintain the copies of the shared data pool with the same data.

In some cases, the OM system can receive multiple operator messages to perform actions on the same object in the shared data pool. For example, one OM system can update an object from the shared data pool and broadcast an update message to other OM systems to also perform the update, and, shortly afterwards, another OM system can replace the object and broadcast a replace message to other OM systems to also perform the replace. Depending on the speed of transmission over the network channels connecting the computers, one OM system can receive the update message before the replace message, and another OM system can receive the replace message before the update message. If each OM system performed the actions in the order the operator messages were received, then the two OM systems would not have the same data in their shared data pool. That is, the OM system that received the replace message after the update message would replace the object. The OM system that received the update message after the replace message would update an object that has been replaced.

To ensure each computer has the same data in their shared data pool, each OM system processes the operator messages based on the sequence in which they were generated, rather than received. For example, since the update message was transmitted first, the OM system that received the update message first would process the update message and then process the replace message. The OM system that received the replace message first would perform the replace. Then, upon receiving the update message, the OM system would recognize that the update message was transmitted prior to the replace message. Since the object to be updated has already been replaced, this OM system would not perform the update. Thus, both OM systems have replaced the object in the shared data pool.

Furthermore, an OM system can discard an operator message or process it at a later time. In some cases an OM system can receive an operator message modifying an object for which it has not yet received an add message. In order to process these operator messages in the appropriate order, each OM system stores received operator messages in a queue. When an OM system retrieves an operator message from the queue that modifies an object for which it has not processed an add message, the OM system places the operator message in the queue again, to process after processing the add message. Also, the OM system maintains a list of current objects that are currently on a page and a list of deleted objects that were deleted from a page for each page of each application section. When an OM system receives a delete or clear message for an object that it has not added yet, the OM system places this object on the list of deleted objects. Then, upon receiving an add message, if the OM system determines that the object was deleted by a delete message that was generated after the add message, the add message is discarded. In this way, an object that has been deleted is not inadvertently added to the shared data pool. The OM system resolves other conflicts between operator messages based on the order in which the operator message was generated and on the node identification of the computer that generated it, as will be described in further detail below.

Additionally, the OM system enables a new computer ("joiner computer") to join in sharing the shared data pool. The OM system at the joiner computer obtains data without preventing other computers from updating the shared data pool. Specifically, the joiner computer broadcasts a joining message on the OM channel. Each OM system broadcasts a node identification identifying that computer on the OM channel. The joiner computer selects the computer that responds first as a "helper computer." Then, the joiner computer sends a data message on the node channel of the helper computer requesting data from the shared data pool. The helper computer will then provide the joiner computer with the data from the shared data pool on the node channel of the joiner computer. In particular, the helper computer first provides the joiner computer with the control section. Then, the helper computer provides the joiner computer with each application section for which a corresponding application program has been invoked at the joiner computer. The other OM systems continue to modify the shared data pool by broadcasting operator messages on the application channels. The joiner computer also receives these messages. As soon as the joiner computer has received the control section, the joiner computer can process these messages in the same manner as the computers already sharing the shared data pool. For example, upon receipt of an operator message indicating a modification of the shared data pool, if the message adds new data or modifies data the computer has received, the computer processes the operator message. On the other hand, if the computer receives an update message for which it has not yet received the data to be updated, the computer queues the update message and processes the update message at a later time.

The computers can share multiple application programs. Each shared application program has a corresponding application section in the shared data pool. In addition to application sections, the shared data pool contains a control section that provides information about the application sections. Each computer can determine which application programs have application sections by viewing the control section. When a computer wants to start sharing data for a new application program, the computer determines whether an application section for that application program has already been created. If one has not been created, the computer creates an application section and provides information about that application section in the control section (i.e., registers the application program). These actions are broadcast on the OM channel so that each other computer subsequently modifies its control section appropriately. If the computer has invoked a copy of the application program corresponding to the application section, the OM system also creates the application section in its copy of the shared data pool.

Figure 2:
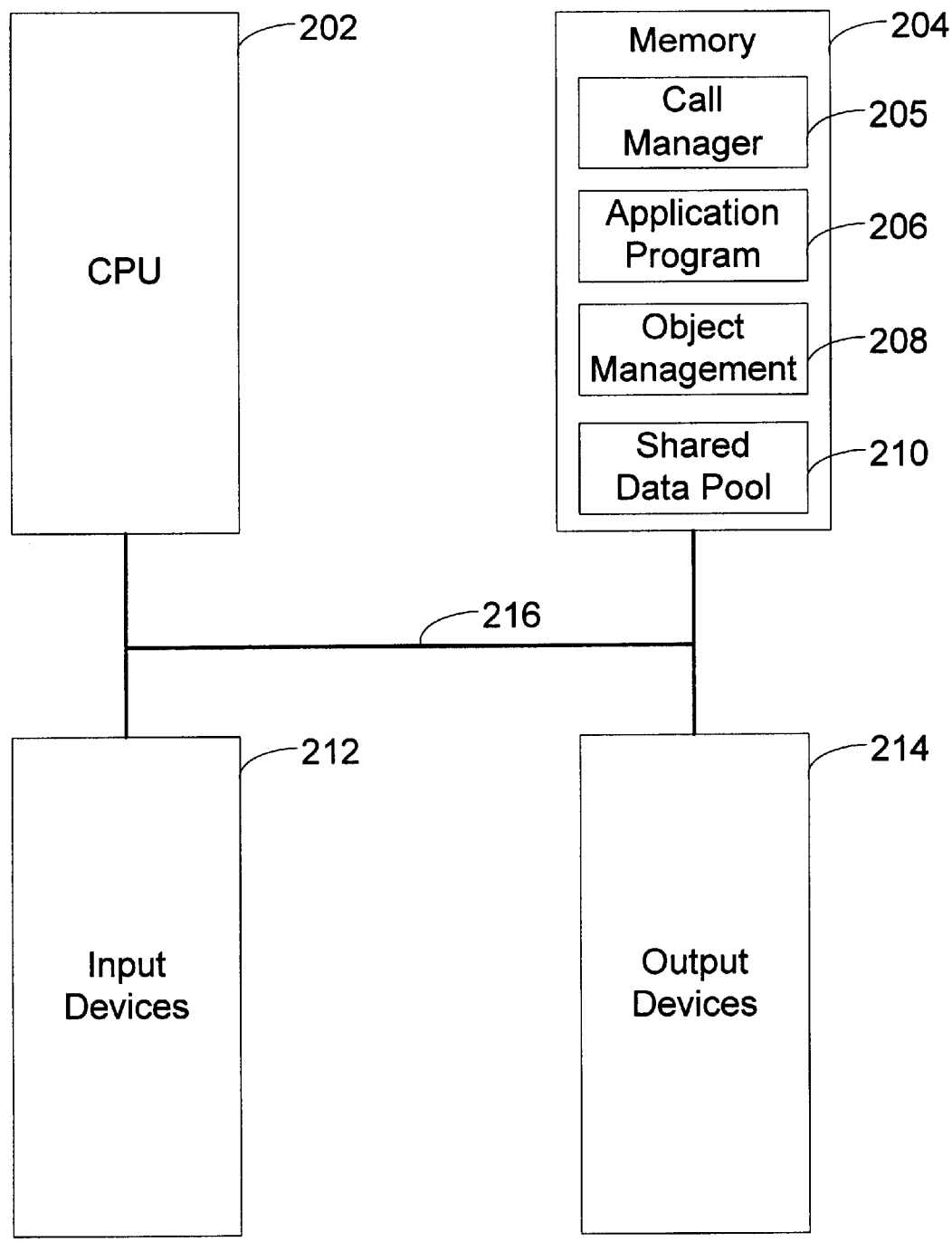
FIG. 2 illustrates a block diagram of a computer on which the OM system executes.

FIG. 2 illustrates a block diagram of a computer on which the OM system executes. The OM system includes a central processing unit (CPU) 202, a memory 204, input devices 212, and output devices 214. The input devices are preferably a keyboard and a mouse. The output devices preferably include a display device, such as a CRT. The CPU, memory, input devices, and output devices are interconnected by a bus 216. The memory contains a Call Management system 205, application programs 206, an Object Manager system 208, and a shared data pool 210. One skilled in the art would recognize that the shared data pool could be stored on a different storage medium, such as a disk, or could be stored partially in memory and partially on a disk.

Figure 3:
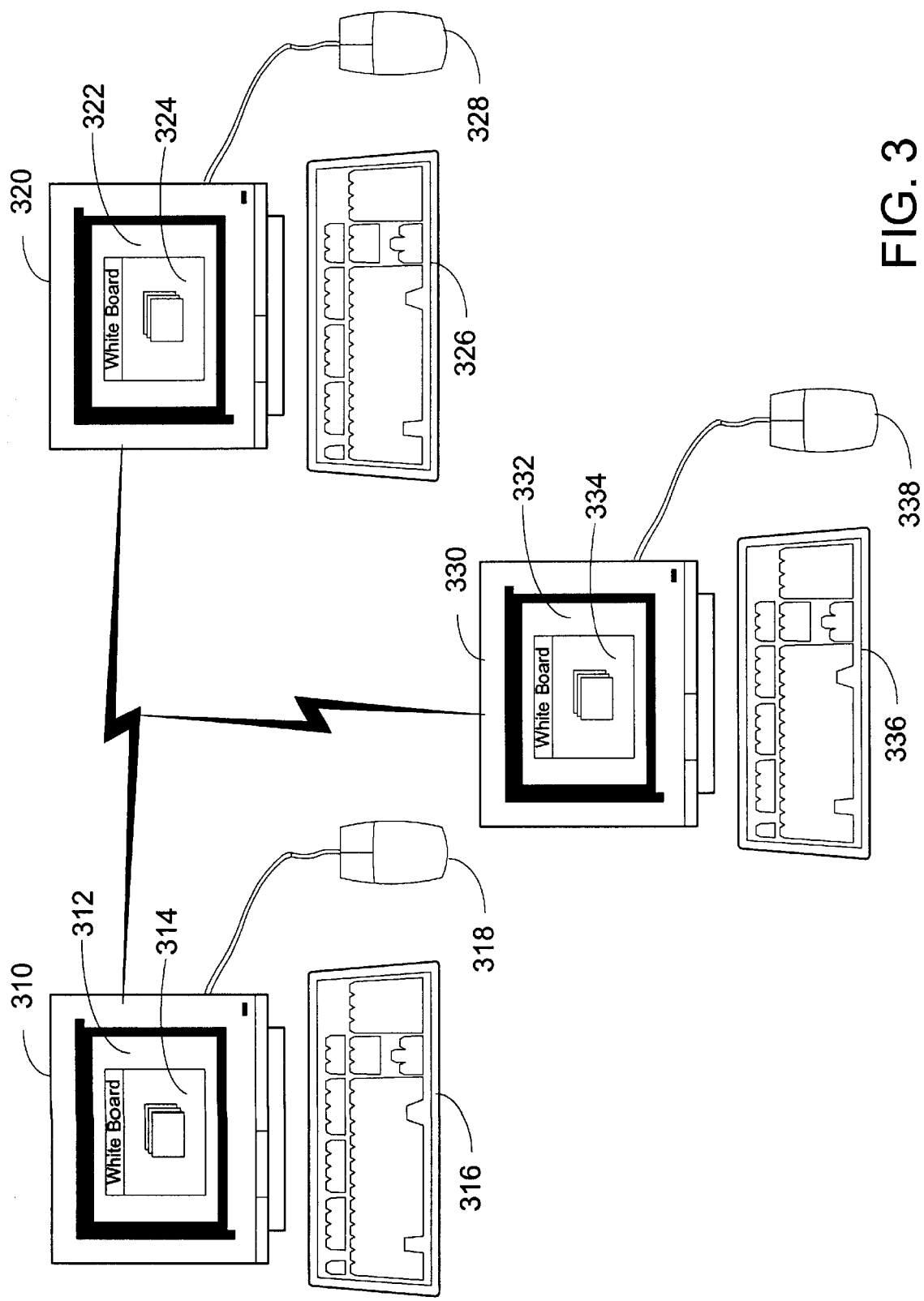
FIG. 3 illustrates a diagram providing an example of a shared application program using a shared data pool under control of the OM system.

FIG. 3 illustrates a diagram providing an example of a shared application program that is using a shared data pool under control of the OM system. In particular, FIG. 3 illustrates an application program that has been invoked at each of three computers and illustrates the same application data displayed at each computer. One computer, node A 310 is connected to other computers, node B 320 and node C 330. Node A includes a keyboard 316, a mouse 318, and a display 312. The display of 312 shows a window 314 for an application program. In this example, the application program entitled "WHITEBOARD" is being shared among the computers and is executing on each computer. The output data of the shared application program is being displayed in window 314.

Both computers node B 320 and node C 330 also display the same output data in their windows. In particular, node B includes a keyboard 326, a mouse 328, and a display 322. A window 324 displays the data for the Whiteboard application program. Node C has a keyboard 336, a mouse 338, and a display 332. The display 332 displays a window with the output of the Whiteboard application program, which corresponds to the windows on node A and node B.

2. Shared Data Pool

A copy of the shared data pool resides on each computer sharing the application programs. The shared data pool is partitioned into sections. One of the sections is a control section that provides information about the contents of the shared data pool. Each other section is an application section that corresponds to an application program. An application section contains information about the corresponding application program and contains the output of that application program. For example, a Whiteboard application section corresponds to a Whiteboard application program. A Whiteboard application program enables users at computers to display objects on a display screen of a computer to emulate a physical Whiteboard. When users at multiple computers share a Whiteboard application program, each user views the output of the Whiteboard application program. When a user at one computer provides input to an application program, the application program interacts with the OM system to modify objects in the shared data pool. The OM system modifies the objects and notifies the OM systems at other computers of the modifications. The OM systems at other computers then modify their copy of the shared data pool.

Figure 4:
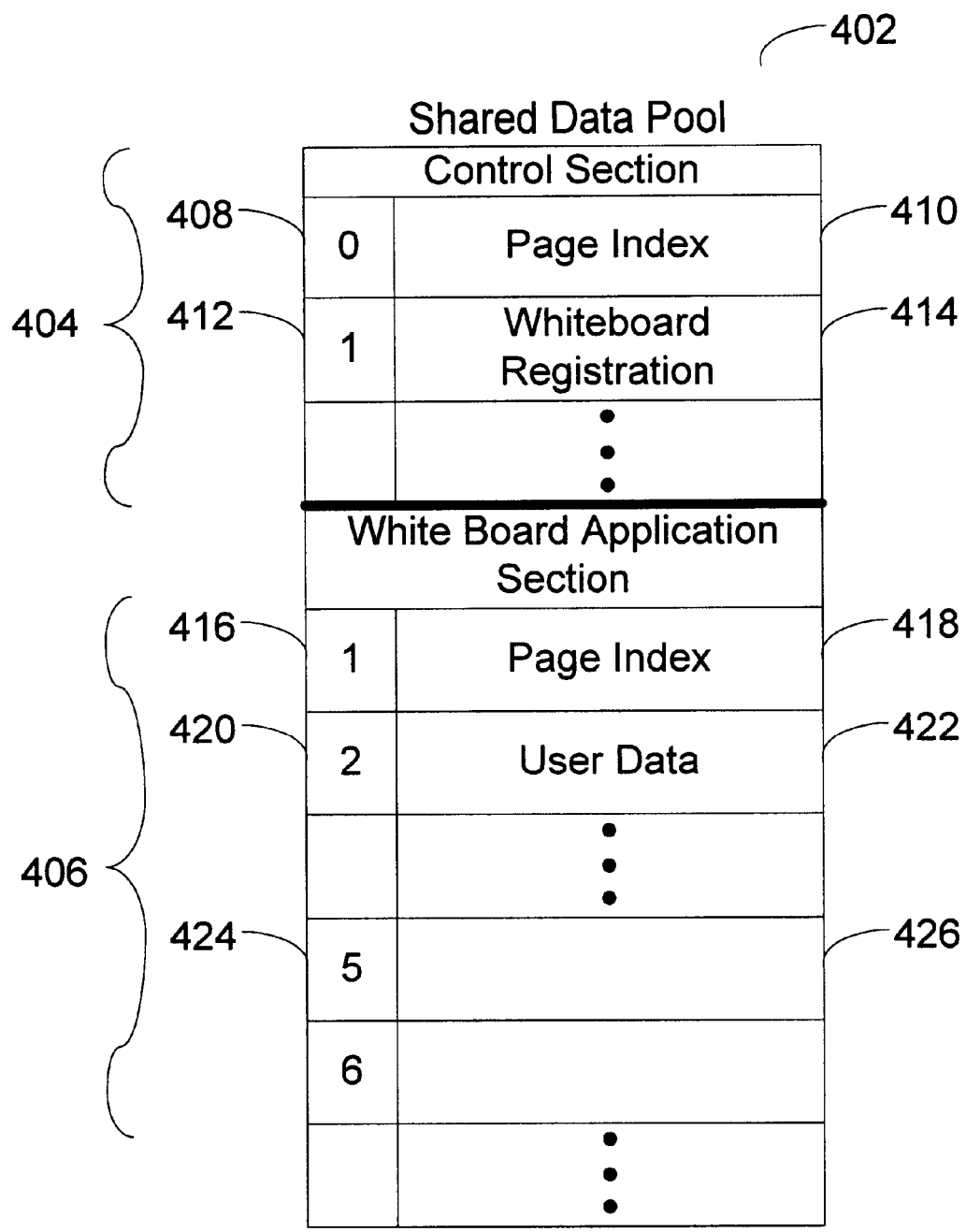
FIG. 4 illustrates a shared data pool.

FIG. 4 illustrates a shared data pool. The shared data pool 402 contains one control section 404 and one or more application sections, such as a Whiteboard application section 406. The control section provides information about the shared data pool, such as which application sections have been created. If multiple control sections existed, it would be possible to have conflicting information in the control sections. Moreover, obtaining information by searching the multiple control sections could be time-consuming. Therefore to ensure accurate and easily accessible information, only one control section is created for the shared data pool.

The control section and each application section is further partitioned into pages. A page corresponds to a grouping of related data. Each section currently has 256 pages, but it could have more or fewer pages. An application program corresponding to a section interacts with the object management system to modify the objects in the section. In order for the application program to know which pages of the application section contain objects and which objects they contain, the first page of a section is typically a page index that identifies the pages in the section and what they contain. An application developer typically defines the type of information that each page is to contain for an application section. The control section 404 has been defined with "Page 0" 408 providing a page index 410 that contains information about the other pages in the control section. Each other page in the control section, such as "Page 1" 412, correspond to application sections.

The control section provides information on the shared data pool, including identifying each application section that corresponds to an application program. When an application program is invoked at two computers simultaneously, it is possible that each computer will create an application section for that application program. Then, the output of the application program at the two computers would be stored in different application sections and the two computers would not be sharing the application program at its output. Therefore, to ensure that only one computer creates an application section for an application program, each OM system prevents other OM systems from modifying the control section (i.e., locks the control section) when registering an application section. The OM system locks the control section by broadcasting a lock message on the OM channel. The OM system then waits to receive lock confirm messages from each other OM system on the OM channel. Upon receiving lock confirm messages from each other OM system, the OM system can modify the control section. After modifying the control section, the OM system notifies other OM systems that they can modify the control section (i.e., unlocks the control section) by broadcasting an unlock message on the OM channel. It is possible for two or more OM systems to broadcast lock messages simultaneously. To resolve conflicts between lock messages, by convention, the lock message having the lowest node identification has priority. In particular, when an OM system receives a lock message, if the OM system has broadcast a lock message, it determines whether it has priority. If the OM system has priority, it sends a lock deny message to the OM system that broadcast the received lock message. If the OM system does not have priority, it broadcasts a lock confirm message and terminates processing of the lock message it had broadcast.

An application program developer may define the partitioning of pages (i.e., which type of data a page can contain)

in an application section. Therefore, each application section can have a unique partitioning of pages. FIG. 4 illustrates a sample partitioning of pages for the Whiteboard application section 406. The Whiteboard application section begins with "Page 1" 416, rather than "Page 0," as in the control section discussed above. "Page 1," rather than "Page 0," of the Whiteboard application section contains a page index 418 that provides information about each page of the application section. "Page 2" 420 contains user data 422. "Page 3" and "Page 4" are reserved for future use. "Page 5" through "Page 255" contain the output of the Whiteboard application program.

Figure 5:
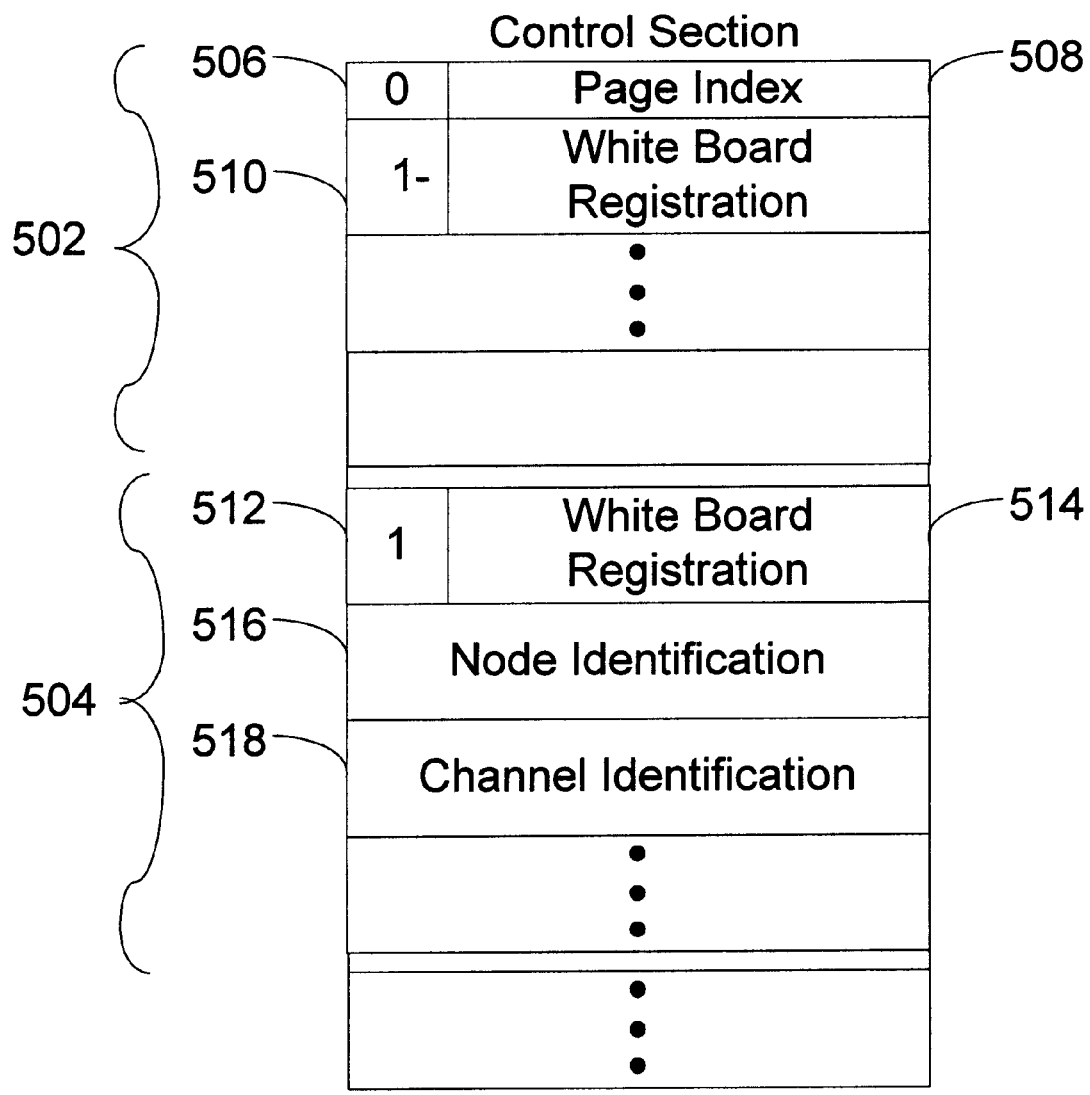
FIG. 5 illustrates a control section of a shared data pool in further detail.

FIG. 5 illustrates a control section in further detail. The control section contains pages such as "Page 0" 502 and "Page 1" 504. The first page of the control section contains a page index. The page index identifies the pages within the control section. In particular, the page index identifies each application program and identifies the page corresponding to that application program. For example, entry 510 indicates that the first page of the control section contains Whiteboard registration information. In particular, the Whiteboard registration information includes node identifications of users 516 and channel identifications 518. The node identifications indicate all of the computers which are sharing a shared data pool for the Whiteboard application. The channel identifications indicate the channel used for sharing the data for the Whiteboard application. Upon registration, the OM system obtains a handle to an initial memory block that references the memory blocks in which objects in the application section are stored. The initial memory block and the memory block in which the objects are stored are dynamically allocated. Therefore, the shared data pool is not necessarily a contiguous portion of memory.

Figure 6:
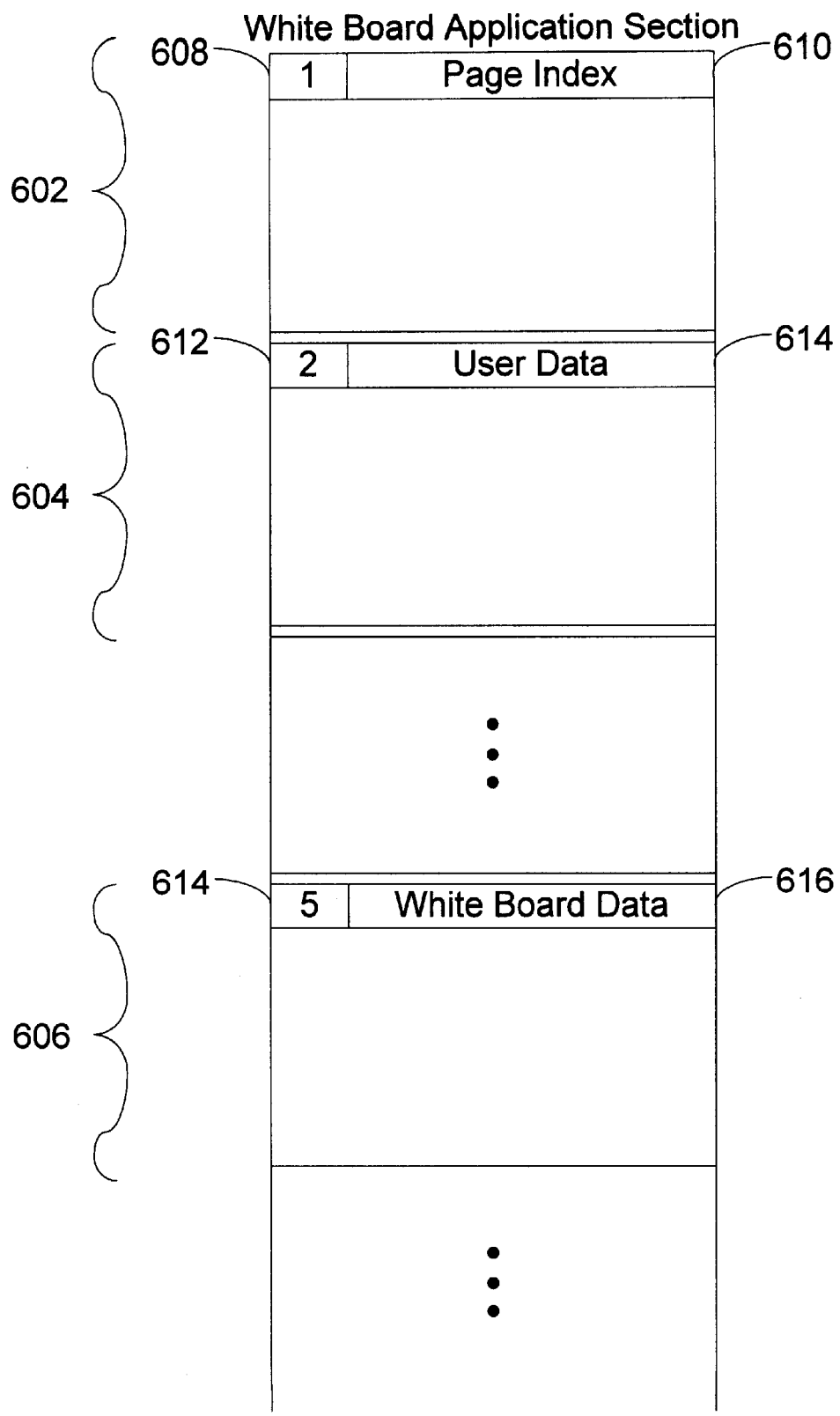
FIG. 6 illustrates a Whiteboard application section of a shared data pool in further detail.

FIG. 6 provides further detail about a Whiteboard application section. The Whiteboard application section has several pages. "Page 1" 602 of the Whiteboard application section is a page index that indicates the data on each other page of this section. "Page 2" 604 provides user data. The user data includes the name of the user and the page of the application section the user is currently viewing. The user data also includes a "synch" flag that indicates whether a user is in "synch" with other users. When the user is in "synch" with the other users sharing the shared data pool, the user views the page from the user who provided the most recent input is viewing. In this case, the synch flag in the user data page is set for the user. On the other hand, a user can choose not to "synch" with other users and view a different page, in which case the synch flag is not set for the user. The user is provided with a user interface element, such as a scroll bar with arrow indicators, that is used to select a particular page for viewing. "Page 5" 606 contains the output of the Whiteboard application program.

Figure 7:
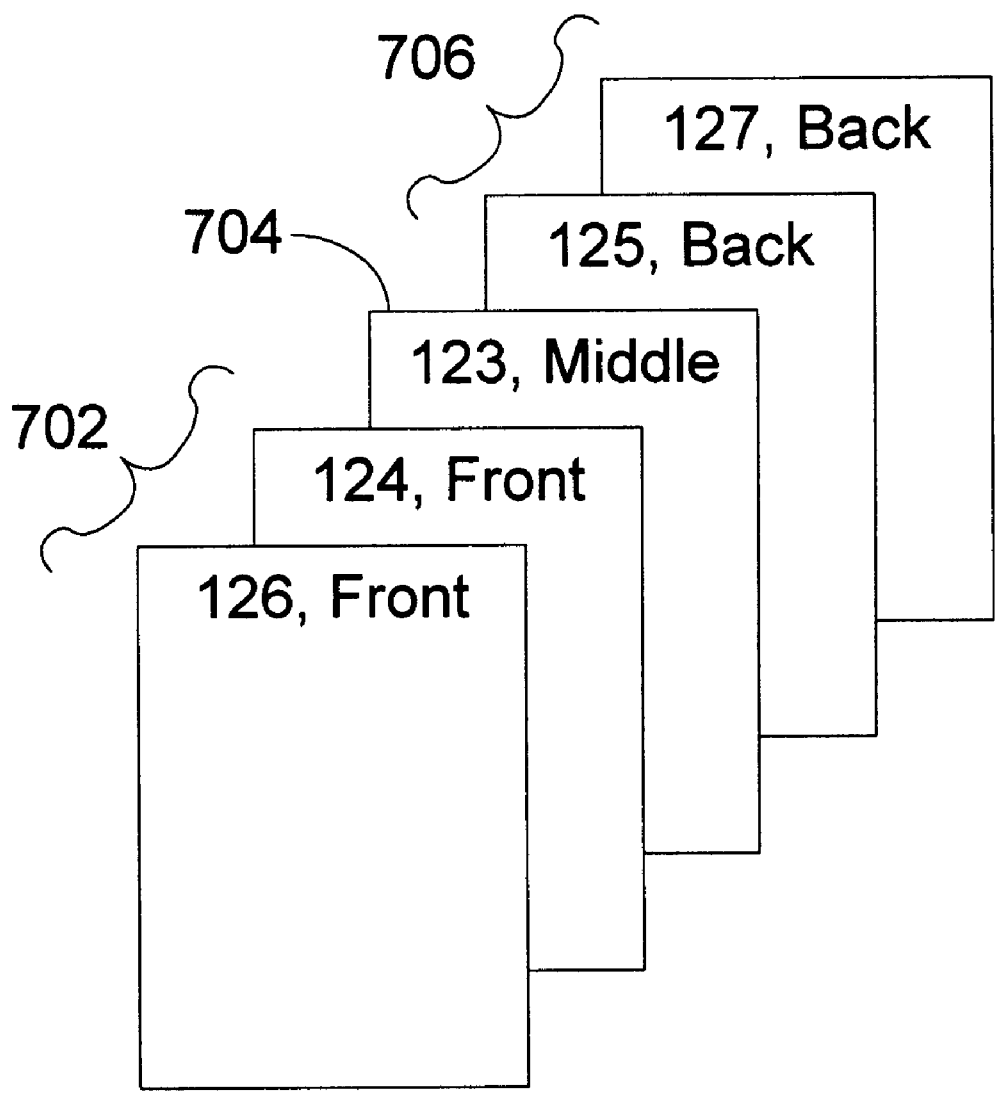
FIG. 7 illustrates a sample set of objects as they would be displayed on a display screen.

FIG. 7 illustrates a sample set of objects as they would be displayed on a display screen. This set of objects would be stored on a single page of an application section. In particular, objects are layered over each other on the display. Each OM system layers objects in the same manner to ensure that each user views objects in the same way. Objects are also sorted into a front region 702, a middle region 704, and a back region 706. An application program generates an object with a sequence stamp that includes a sequence identification identifying the order in which the object was generated and with a node identification identifying the computer generating the object. Within the front region, the objects are ordered by their sequence identification, with the highest sequence identification being in front of all objects with lower sequence identifications. In the middle region, objects are added to the end of the region. In the back region, objects are ordered by their sequence identifications so that the first object in the back region has the lowest sequence identification and is displayed over each object with a higher sequence identification. If two objects have the same sequence identification, then they are ordered by their node identifications. Each object is identified by a local object handle, which is used by an application program to identify which object to modify when the OM system processes an operator message. Moreover, for each object, the local handle is translated into a global handle prior to transmitting an operator message to other OM systems. Each other OM system then translates the global handle into a local handle for use by the application program at that computer system. An object is a string of data that the OM system does not interpret. The OM system only places the object in the shared data pool, and the application program interprets the object.

3. Establishing a Call

Before computers can share a shared data pool for application programs, they need to be connected through the network to enable the transfer of output data between them (i.e., participate in a Call). When computers are in a Call, the computers have established a connection through which they can share the shared data pool.

Figure 8:
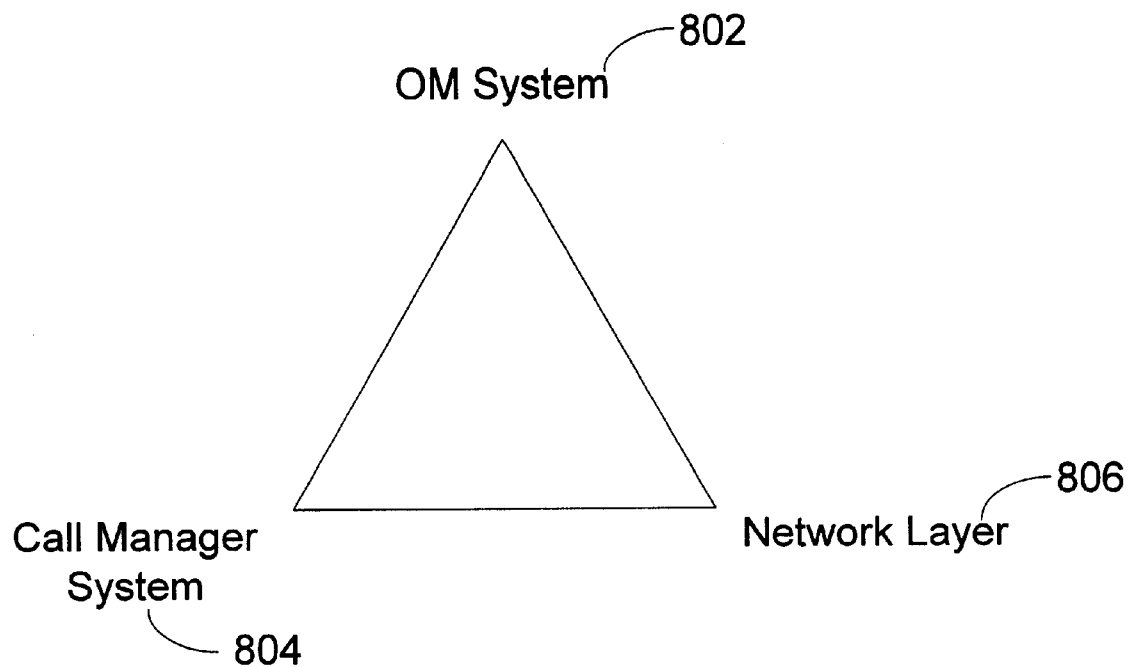
FIG. 8 illustrates a layered architecture.

In a preferred embodiment, a user invokes a Call Manager system to establish network connections. A Call Manager system provides a set of application programming interfaces (APIs) for the OM system to interact with the network. FIG. 8 illustrates the architecture of a preferred embodiment of the present invention. In particular, the OM system 802, the Call Manager system 804, and the network layer 806 are interconnected. A user invokes the Call Manager system to establish a Call. In turn, the Call Manager system invokes the network layer to establish a Call. After establishing the Call, the Call Manager system notifies the OM system that a Call has been established. Once a Call has been established, any OM system in the Call can create a control section for the shared data pool. Once a control section has been created, any OM system can create an application section for a particular application program that is to be shared. The OM system interacts directly with the network layer to transmit messages to other computer systems.

Before a user can share an application program, the user requests a Call Manager system to establish a Call. With the request, the user identifies other users with which to establish a Call through use of the dialog box which displays names of users associated with the computers in the network. To establish the Call, the Call Manager system notifies each of the Call Manager systems at the identified computers that a Call is being established. The Call Manager systems at each of the identified computers "joins" the first Call of which they are notified. After one or more other computers has joined the Call, application programs can use the OM system to share a shared data pool.

In a preferred embodiment of the present invention, the computers which are to share an application program are connected through a network based on a T.120 multipoint data conferencing standard (i.e., T.120 network). The T.120 network is a standard for communication among software and hardware products. The T.120 network provides a set of APIs that enable the computers in the network to communicate with each other. The T.120 network includes multiple channels over which the computers are connected. The T.120 network assigns each computer connected to the network a unique node identification. Also, the T.120 network assigns each channel which is part of the network a unique channel identification. Additionally, the OM system can request channels from the T.120 network, including an OM channel on which the OM systems communicate, a node channel on which particular computers communicate, and application channels on which application data is broadcast.

When a user invokes the Call Manager system to establish a Call, the Call Manager system requests an OM channel from the T.120 network by invoking an API function. The T.120 network allocates an OM channel for the Call. After allocating the OM channel, the T.120 network provides the Call Manager system with the channel identification. In turn, the Call Manager system notifies the OM system that a channel has been allocated and provides the channel identification. Additionally, when a particular application program is shared, the OM system obtains a channel from the Call Manager system for the application program. Then, any computer participating in the sharing of the particular application program communicates with all other computers by broadcasting messages over the allocated channel.

Because the T.120 network identifies the channel as having been allocated for a Call, when a joiner computer wishes to join a Call, the joiner computer first uses the Call Manager system to determine the OM channel allocated for the Call. The Call Manager system interacts with the T.120 network to enter the joiner computer in the Call. Then, the user can invoke the OM system to attempt to join in sharing application programs using a shared data pool. Once in the Call, an OM system at the joiner computer uses the channel to broadcast and receive messages for sharing a shared data pool. For example, the OM system at the joiner computer can broadcast a message to all of the computers currently in the Call requesting to join in sharing the shared data pool.

4. Object Management System

The OM system enables sharing of application programs using a shared data pool. Initially, when an OM system is notified by the Call Manager system that a Call has been established, the OM system attempts to create a control section. As discussed above, only one control section is created. In particular, one OM system creates a control section, and each other OM system creates a copy of this control section for its shared data pool. The first OM system to obtain a preassigned network token (i.e., a network token recognized by each computer in the network) creates the control section. Then, when a computer is to share an application program, the OM system at that computer creates an application section for the application program, creates a registration page for the application program in the control section, and updates the page index of the control section to include an entry for the new registration page. Once a control section and an application section have been created, the OM systems can share the application program corresponding to the application section using the shared data pool.

When a new computer wants to join in sharing application programs using the shared data pool, the OM system at that computer obtains control data from an OM system that is already using the shared data pool. Then, the OM system registers itself by indicating in the control section which application programs it wishes to share. Next, the OM system obtains application sections from an OM system that is already using the shared data pool for the application programs it wishes to share.

Figure 9:
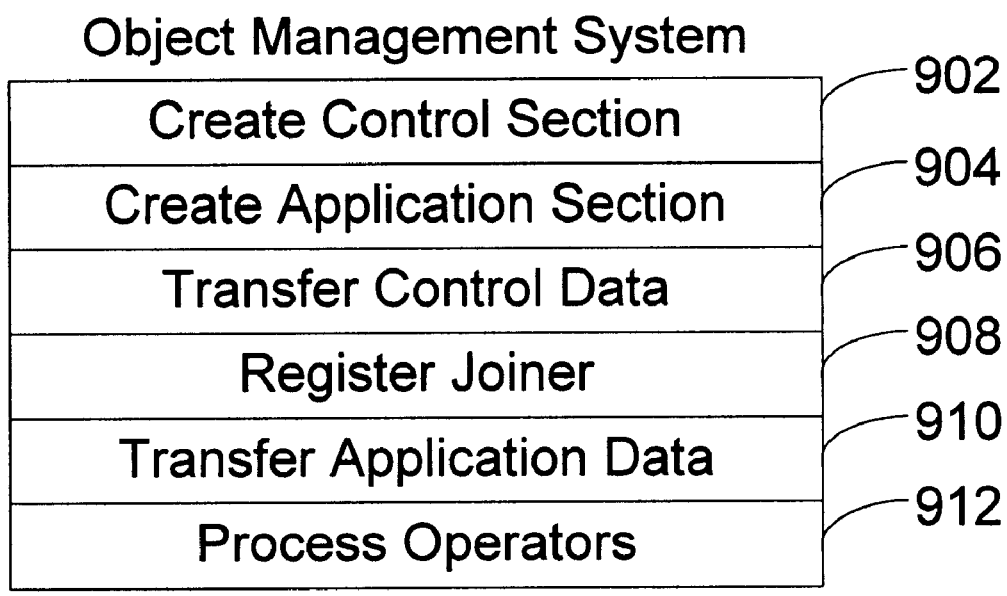
FIG. 9 illustrates the components of an OM system.

The OM system has several components. Each component performs a particular process. FIG. 9 illustrates the components of an OM system. The OM system includes a create control section component 902 that creates a control section. The create application section component 904 creates an application section. The transfer control data section 906 is used to provide a joiner computer with control data. The register joiner component 908 is used to register a joiner computer by adding the joiner computer's node identification into a registration page of an application program. The transfer application data component 910 transfers application data to a joiner computer. The process operators component 912 processes operator messages.

4.1 Creating a Control Section

Figure 10:
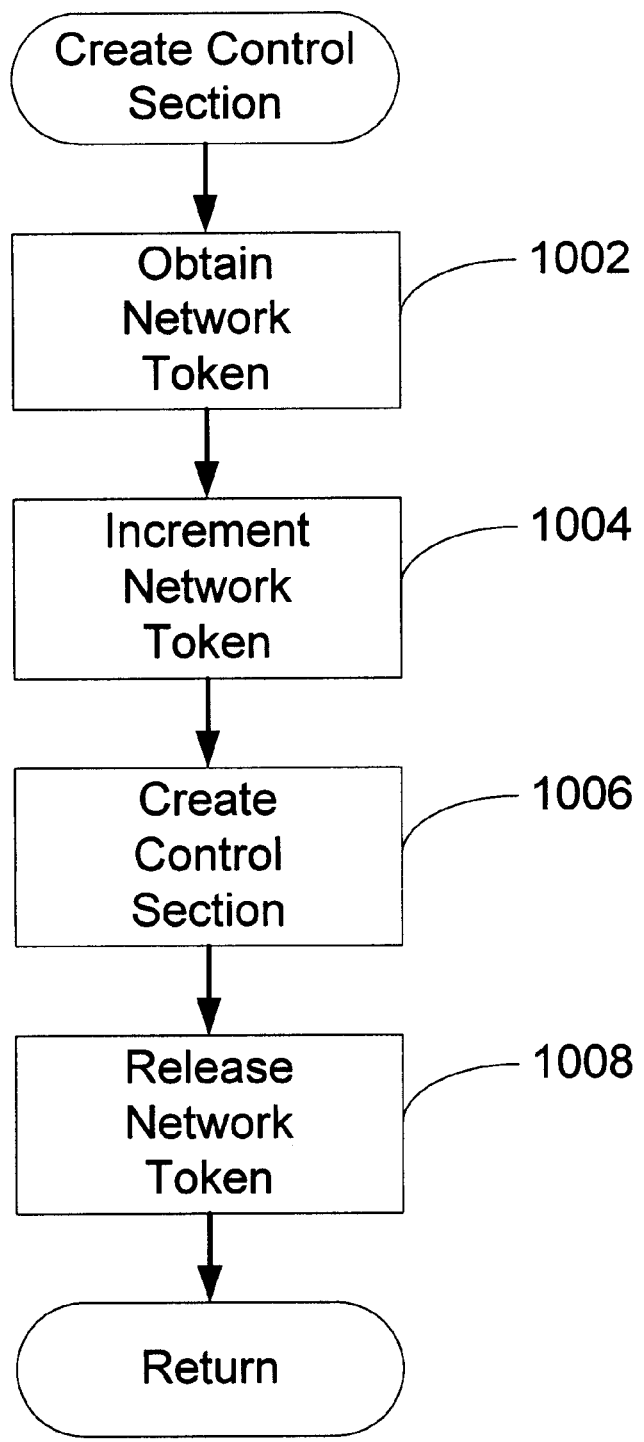
FIG. 10 illustrates an overview flow diagram of the create control section routine.

Initially, an OM system at one of the computers in the Call creates a control section. The control section identifies the application sections. The OM systems use a predefined network token to ensure that only one OM system creates a control section. To create a control section, an OM system obtains a predefined network token from the T.120 network using the Call Manager system. The network token initially has an associated token count with a value of zero. When the Call Manager system obtains the predefined network token, the Call Manager system increments the token count to one and notifies the OM system that it can create a control section. After creating the control section, the OM system releases the network token. After the control section has been created, any other OM system which attempts to create a control section will first obtain the network token. When the token count of the network token is greater than zero, the OM system recognizes that a control section has already been created and does not create another one. FIG. 10 illustrates an overview flow diagram of the create control section routine. In step 1002, the create control section routine obtains the network token. In step 1004, the create control section routine increments the token count. In step 1006, the create control section routine creates a control section. In step 1008, the create control section outine releases the network token.

4.2 Creating an Application Section

To start sharing a shared data pool, an OM system locks the control section. To lock the control section, the OM system broadcasts a lock message and waits to receive lock confirm messages from the other OM systems. Upon receiving lock confirm messages, the OM system provides information in the control section about the application program. As discussed above, when the control section is created, it contains 256 pages, but can contain more. The first page is the page index. Each other page is a registration page. First, the OM system adds an entry to the page index of the control section to identify the next available page in the control section as a registration page for the new application program. Then, the OM system enters user and channel data in the registration page for the application program. Next, the OM system creates an application section. The OM system returns to the application program a handle to the application section. The application program uses the handle to identify the application section of the shared data pool it wants to modify in all operator messages. Then, the OM system broadcasts an unlock message.

Additionally, the OM system broadcasts messages to each other computer of each action that it performs. Each OM system receives the broadcast messages and modifies its shared data pool by creating the application section and modifying the control section to reflect the addition of the application section. Then, each other computer that wants to share the application program adds itself to the user list for the application program in the registration page for the application program in the control section. Also, the OM system obtains channel data from the registration page of the control section that identifies the application channel for the application program. Upon obtaining the channel data, each OM system broadcasts operator messages on the application channel. In this manner, each OM system at each other computer obtains information to modify the shared data pool to reflect the new modifications that were made.

Figure 11:
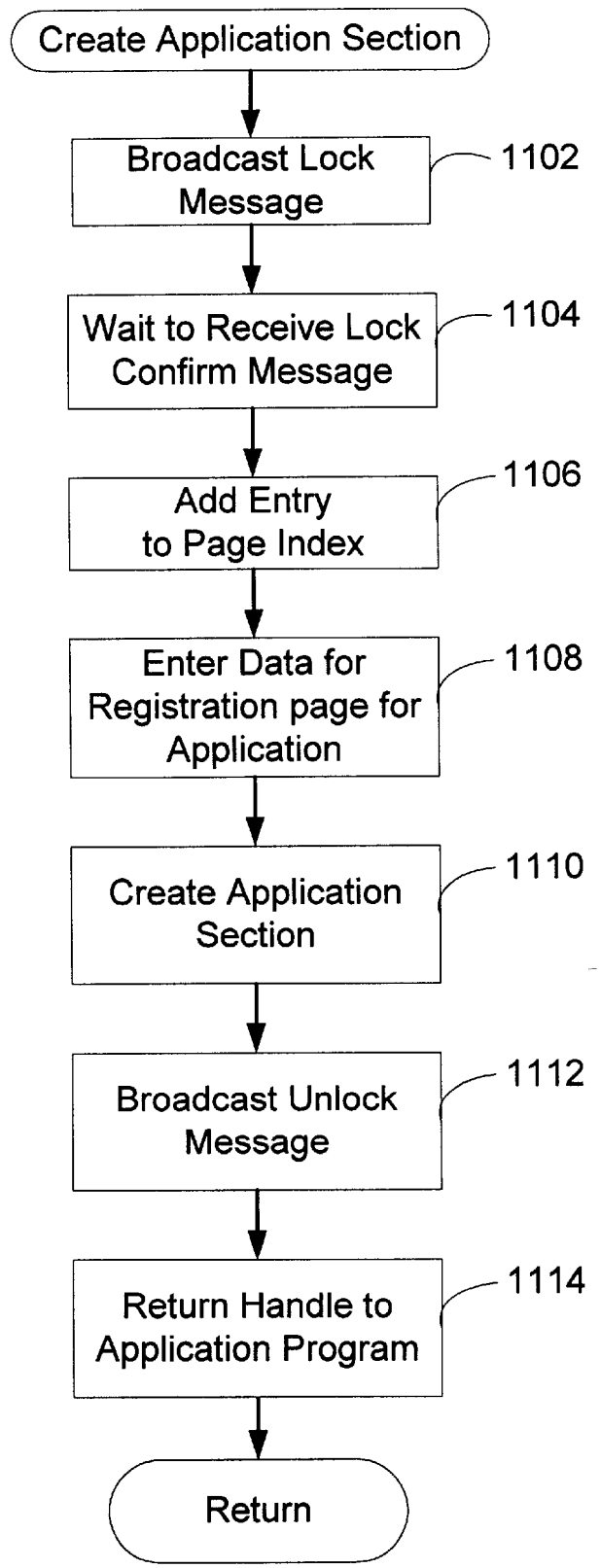
FIG. 11 illustrates an overview flow diagram of the create application section routine.

FIG. 11 illustrates an overview flow diagram of the create application section routine. In step 1102, the create application section routine broadcasts a lock message. In step 1104, the create application section routine waits to receive lock confirm. In step 1106, the create application section routine adds an entry to the page index of the control section identifying a new registration page. In step 1108, the create application section routine enters data for a registration page for the application program. In step 1110, the create application section routine creates an application section. In step 1112, the create application section routine broadcasts an unlock message. In step 1114, the create application section routine returns a handle to the application section to the application program.

4.3 Joiner Computer

When a joiner computer wishes to join in sharing the shared data pool, the OM system of the joiner computer obtains control data from a helper computer. The OM system uses the received control data to create a control section at its computer. The OM system then determines from the control data which application sections are available. The OM system can then request application sections for application programs it wishes to share from the helper computer. If an application section is not available for an application program it wishes to share, the OM system creates an application section as discussed above.

Figure 12A:
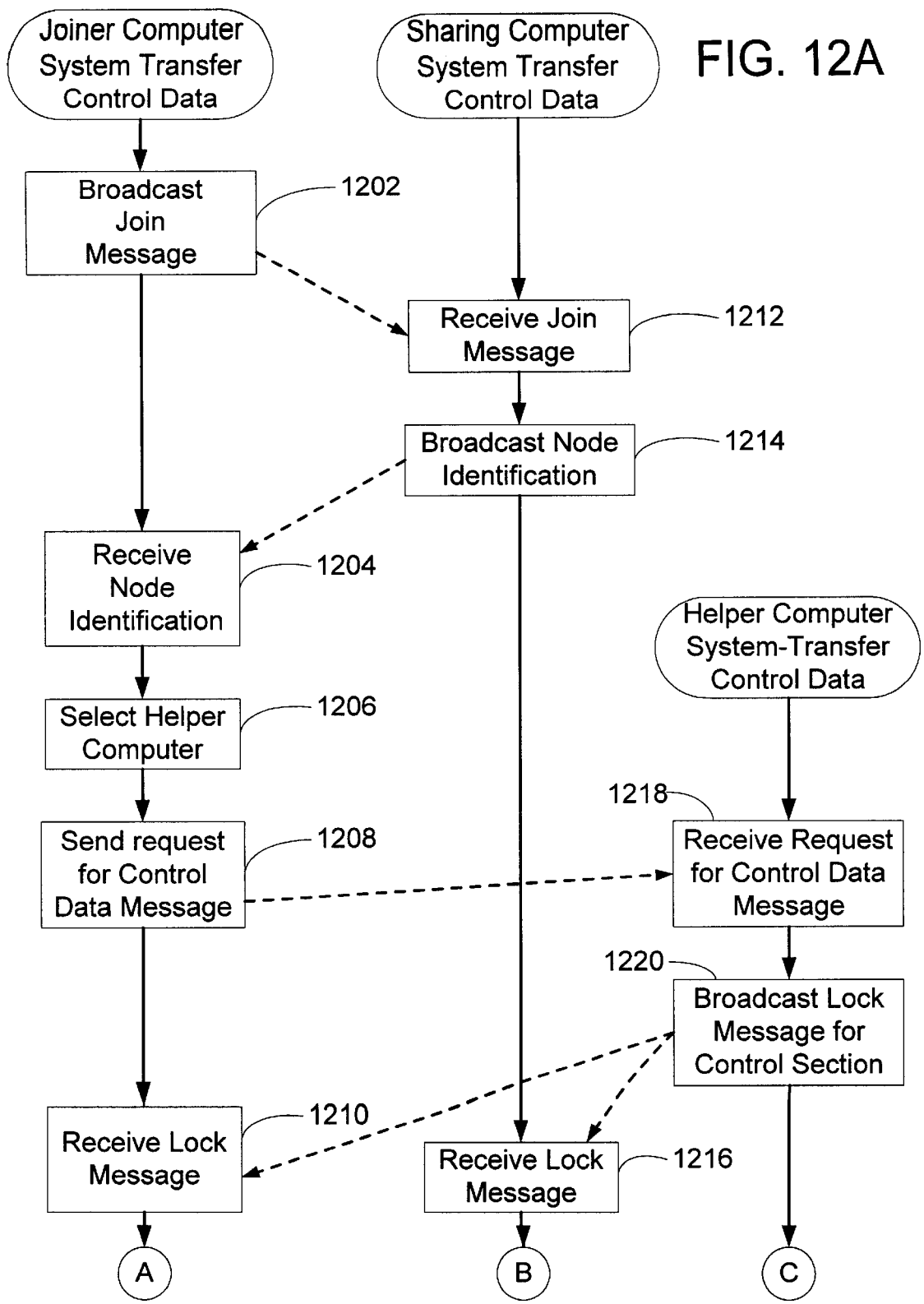
FIGS. 12A and 12B illustrate an overview flow diagram of the transfer control data routine.
Figure 12B:
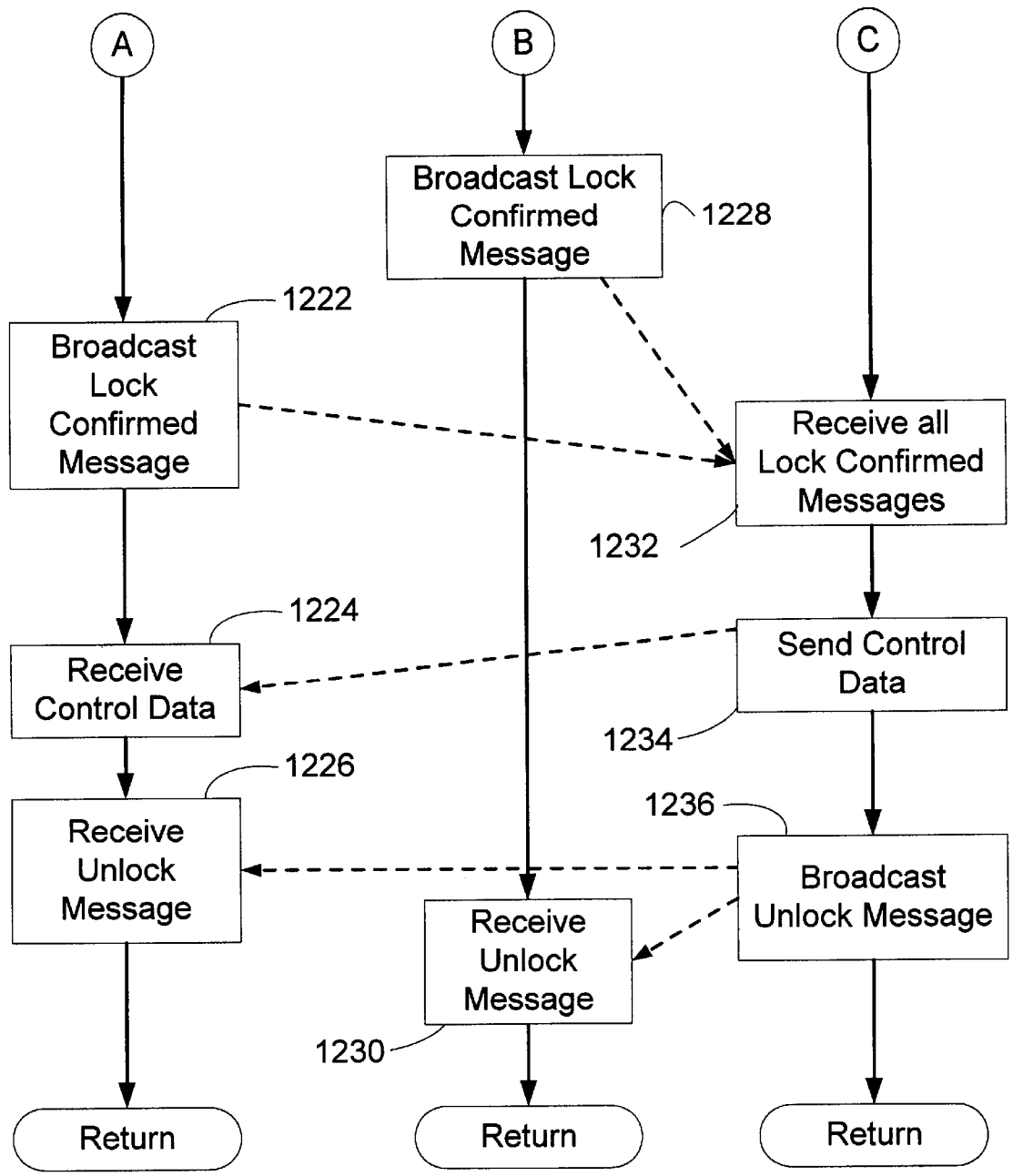

FIGS. 12A and 12B illustrate an overview flow diagram of the transfer control data routine. When a joiner computer wishes to obtain control data, the joiner computer broadcasts a join message on the OM channel to all computers sharing the shared data pool (i.e., the sharing computers). The sharing computers broadcast their node identifications on the OM channel. Upon receiving a node identification, the joiner computer selects the computer that broadcast the message as a helper computer. Then, the helper computer provides the joiner computer with control and application data. In particular, FIGS. 12A and 12B illustrates the steps taken by a joiner computer attempting to share a shared data pool, by sharing computers, and by a helper computer. In step 1202, the joiner computer broadcasts a join message on the OM channel to the sharing computers. In step 1212, each of the sharing computers receives the join message. In step 1214, each of the sharing computers broadcasts a node identification on the OM channel to identify itself to the joiner computer. In step 1204, the joiner computer receives the node identifications. In step 1206, the joiner computer selects the first sharing computer whose node identifications it has received to be a helper computer.

After selecting a helper computer, in step 1208, the joiner computer sends a request for control data on the helper computer's node channel to the helper computer. In step 1218, the helper computer receives the request for control data. The helper computer will send control data to the joiner computer. To avoid having other computers modify the data as it is being sent, the helper computer locks the control section. In step 1220, the helper computer broadcasts a lock message on the OM channel for the control section. In step 1210 and step 1216, the joiner computer and the sharing computers, respectively, receive the lock message. In step 1222 and step 1228, the joiner computer and the sharing computers, respectively, broadcast lock confirm messages on the OM channel. In step 1232, the helper node receives the lock confirm messages. In step 1234, the helper computer sends control data on the joiner computer's node channel to the joiner computer. In step 1224, the joiner computer receives the control data and creates a control section at its computer. In step 1236, the helper computer broadcasts an unlock message on the OM channel. In steps 1226 and 1230, the joiner computer and sharing computers, respectively, receive the unlock message.

Figure 13B:
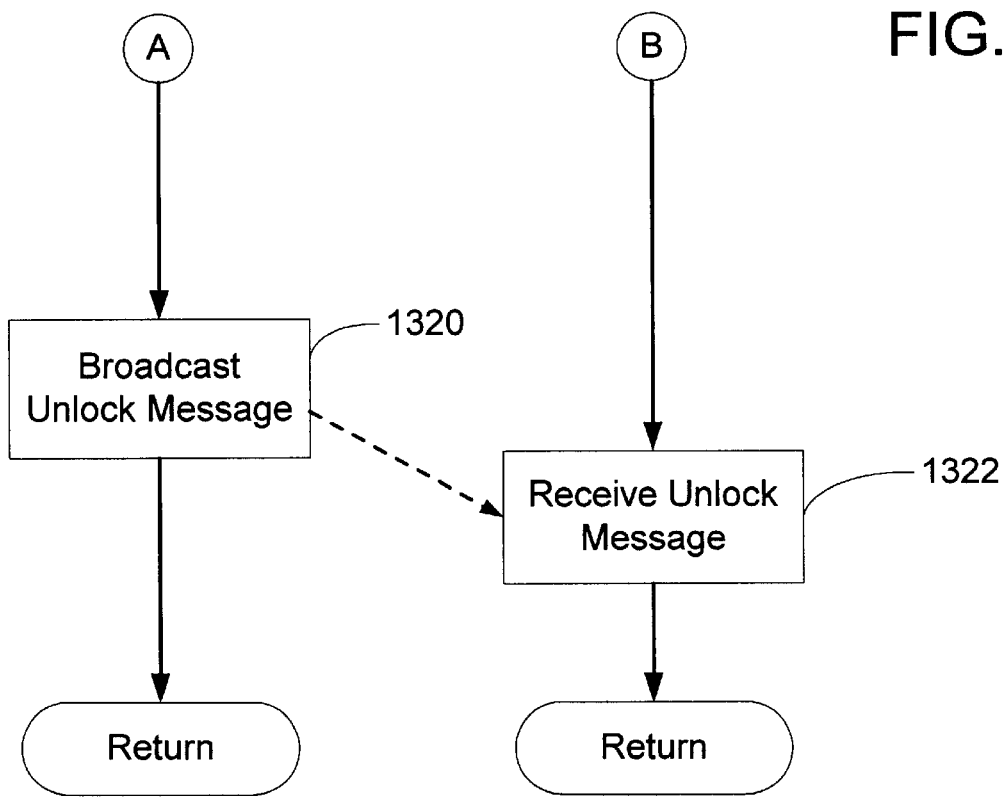

When computers are sharing application programs using a shared data pool, the control section identifies which application sections are being used by particular computers. When a new computer joins in sharing the shared data pool, the new computer adds its node identification to the registration page for each application program it is interested in sharing. FIGS. 13A and 13B illustrate an overview flow diagram of the steps taken by a joiner computer and sharing computers to register the joiner computer. In step 1302, the joiner computer receives a request from a user to share an application program. If two computers were to modify the control section at the same time, one could overwrite the other. To avoid this, the joiner computer locks the control section before modifying it. In step 1304, the joiner computer broadcasts a lock message on the OM channel to lock the control section. In step 1312, the sharing computers receive the lock message. In step 1314, the sharing computers broadcast a lock confirm message on the OM channel. In step 1306, the joiner computer receives all lock confirm messages. In step 1308, the joiner computer adds its node identification to the registration page of the application for which it wishes to share the shared data pool. In step 1310, the joiner computer broadcasts a registration message on the OM channel. In step 1316, the sharing computers receive the registration message. In step 1318, the sharing computers process the received registration message to register the joiner computer in their copies of the shared data pool. In step 1320, the joiner computer broadcasts an unlock message on the OM channel. In step 1322, the sharing computers receive the unlock message.

Figure 14:
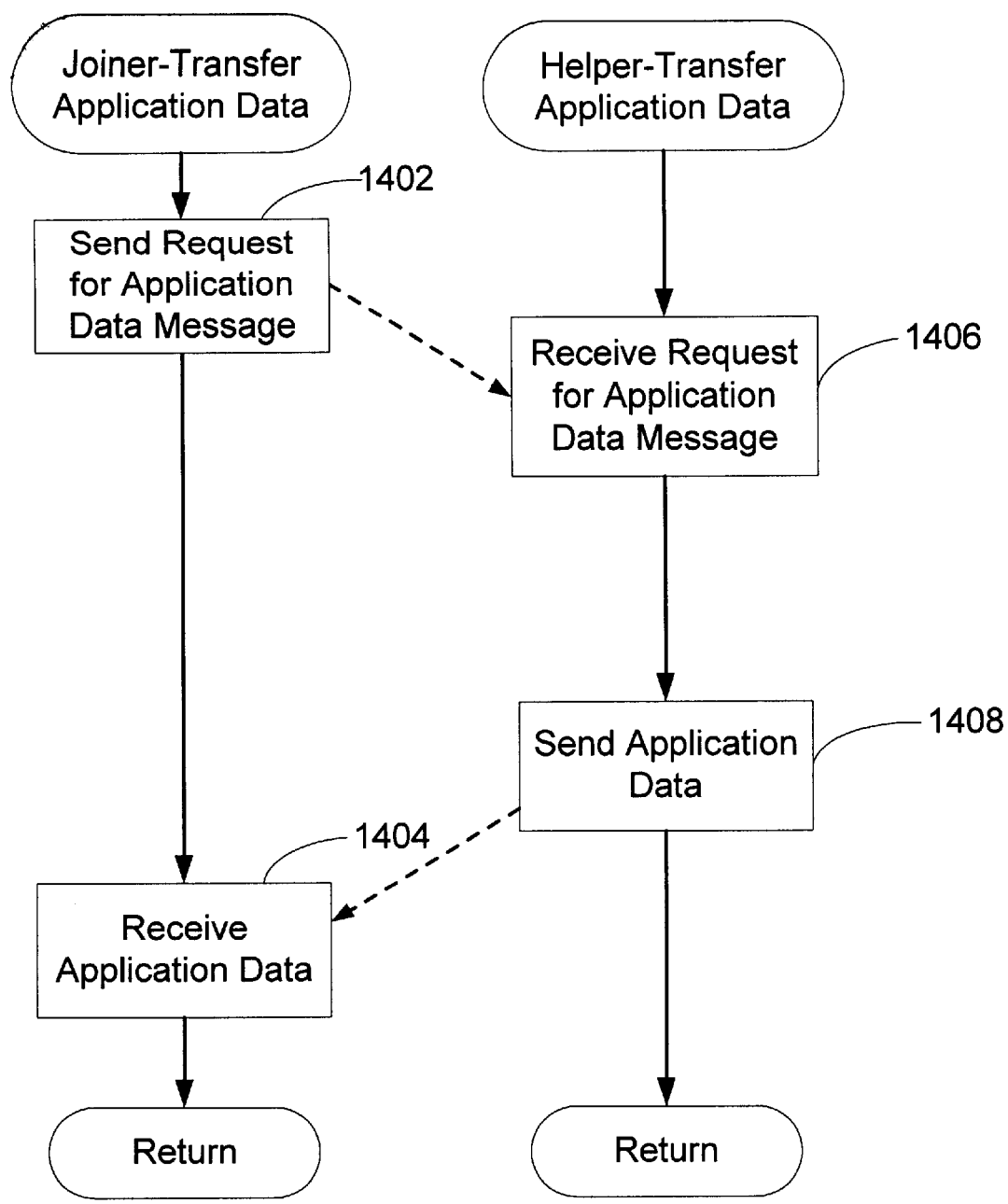
FIG. 14 illustrates an overview flow diagram of the transfer application data routine.

After a joiner computer has received control data, and registered itself, the joiner computer obtains application data to create application sections in its shared data pool. To obtain application data, the joiner computer requests this data from the helper computer, which was selected when the joiner computer broadcast a join message. FIG. 14 illustrates an overview flow diagram of the transfer application data routine. In step 1402, the joiner computer sends a request for application data on the node channel of the helper computer. In step 1406, the helper computer receives the request for application data. In step 1408, the helper computer sends application data on the node channel of the joiner computer. In step 1404, the joiner computer receives the application data and creates application sections.

4.4 Operator Messages

Once a computer has a control section, application programs at that computer can obtain an initial memory block for their application sections and can process operators for that application section using the OM system. In particular, an application program forwards an operator message to the OM system to perform an action on an object. The OM system processes the operator message an d broadcasts the operator message to the other OM systems on the application channel for that application program. Upon receiving the operator message, the other OM systems process the message. Each OM system also forwards an event to the application program, indicating the action that was performed.

Each operator message specifies an action and specifies the object on which the action is to be performed. The operator messages include a clear message, a move message, an add message, a replace message, an update message, and a delete message. A clear message indicates that all of the objects on a page are to be deleted. A delete message indicates that a particular object on a page is to be deleted. An add message indicates an object to be added to a page, either to a front, a middle, or a back region. A move message indicates that an object is to be moved to the front, middle, or back region. A replace message indicates that an entire object is to be replaced. The update message indicates that a portion of an object is to be updated.

Each operator message has a sequence stamp that includes a node identification as well as a sequence identification. The node identification identifies the computer that broadcast the operator message. The sequence identification indicates the order in which that operator message was generated. Whenever an OM system generates a particular operator message, it generates a sequence identification. Moreover, the OM system maintains an operator stamp for each type of operator at the computer that indicates when an operator message for that operator was last processed. In particular, a clear operator has a clear stamp; an add operator has an add stamp; a move operator has a move stamp; an update operator has an update stamp; and a replace operator has a replace stamp. However, the delete operator does not have a delete stamp. Instead, the OM system maintains a list of all objects that have been deleted. Along with each of these operator stamps, the OM system maintains the node identification of the computer that broadcast the last operator message for the operator. For each of these operators, the respective operator stamp is initially one. The sequence identification for a particular operator message is set to the operator stamp for the operator. For example, when an OM system generates an add message, the OM system sets the sequence identification in the add message to the value of the add stamp. Then, the OM system increments the operator stamp (e.g., the add stamp) by one.

Each OM system uses the sequence identification in an operator message to determine when the operator message was generated. Also, each OM system uses the operator stamp stored at the computer to determine the sequence of the last operator message it processed. Therefore, it is important to update the operator stamps based on the received sequence identifications. When an OM system receives an operator message with a sequence identification that is greater than the operator stamp it has stored for a particular operator, the OM system updates its operator stamp with the value of the received sequence identification. For example, if an OM system has an add stamp with the value of one, and the OM system receives an add message with a sequence identification with the value of two, the OM system updates its add stamp with the value of two.

In some cases, an OM system can receive an operator message to update, move, or delete an object that has not been added yet. To resolve this problem, each OM system stores operator messages in a queue. Moreover, each OM system maintains a list of current objects that are currently on a page of an application section. When an operator message is received, the OM system determines whether the object is on the page of the application section using the list of current objects. When the object is not on the page of the application section, the OM system places the operator message back in the queue to process after the object has been added to the application section. However, a replace message replaces an entire object. Therefore, if the OM system receives a replace message for an object that has not been added, the OM system processes the replace message by placing the object specified by the replace message in the shared data pool and adding the object to the list of current objects. Then, when the add message for the object is later received, it is discarded. When a delete message is received, the object to be deleted is added to the list of deleted objects. If the object is in the list of current objects, it is removed from this list. Once the object is in the list of deleted objects, when an add message is later received for the object, the add message is discarded.

In addition, an OM system can receive an operator message to modify an object (i.e., an update message) that has already been deleted. For example, an update message that was generated before a delete message could be received after the delete message. Similarly, the update message could have been generated prior to a clear message. In this case, the OM system recognizes that it cannot update the deleted object. Therefore, upon receiving an operator message, the OM system determines whether the object has already been deleted using the list of deleted objects. If the object was deleted by a delete message generated after the received operator message, the operator message is discarded, otherwise it is processed, as discussed in detail below.

An OM system can also receive an operator message with a sequence identification which equals the operator stamp for that operator. For example, the OM system can receive an update message with a sequence identification of two from two different computers. If the OM systems process the update messages in different orders, the shared data pools at the computers will not reflect the same data. Therefore, each OM system determines which update message to process and which to discard using the node identifications. By convention, the operator message with the lower node identification is processed.

Figure 15A:
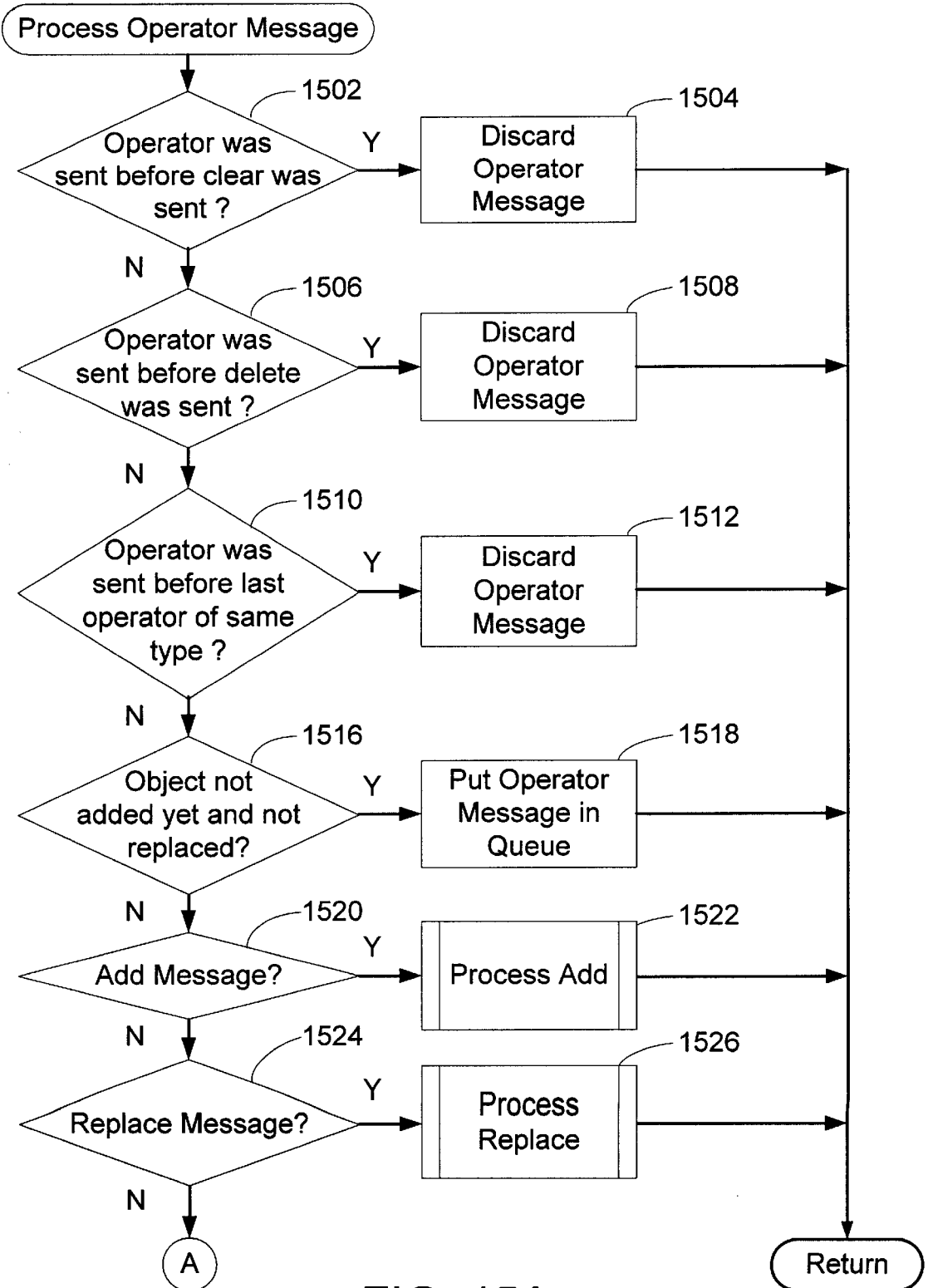
FIGS. 15A and 15B illustrate an overview flow diagram of the process operator messages routine.
Figure 15B:
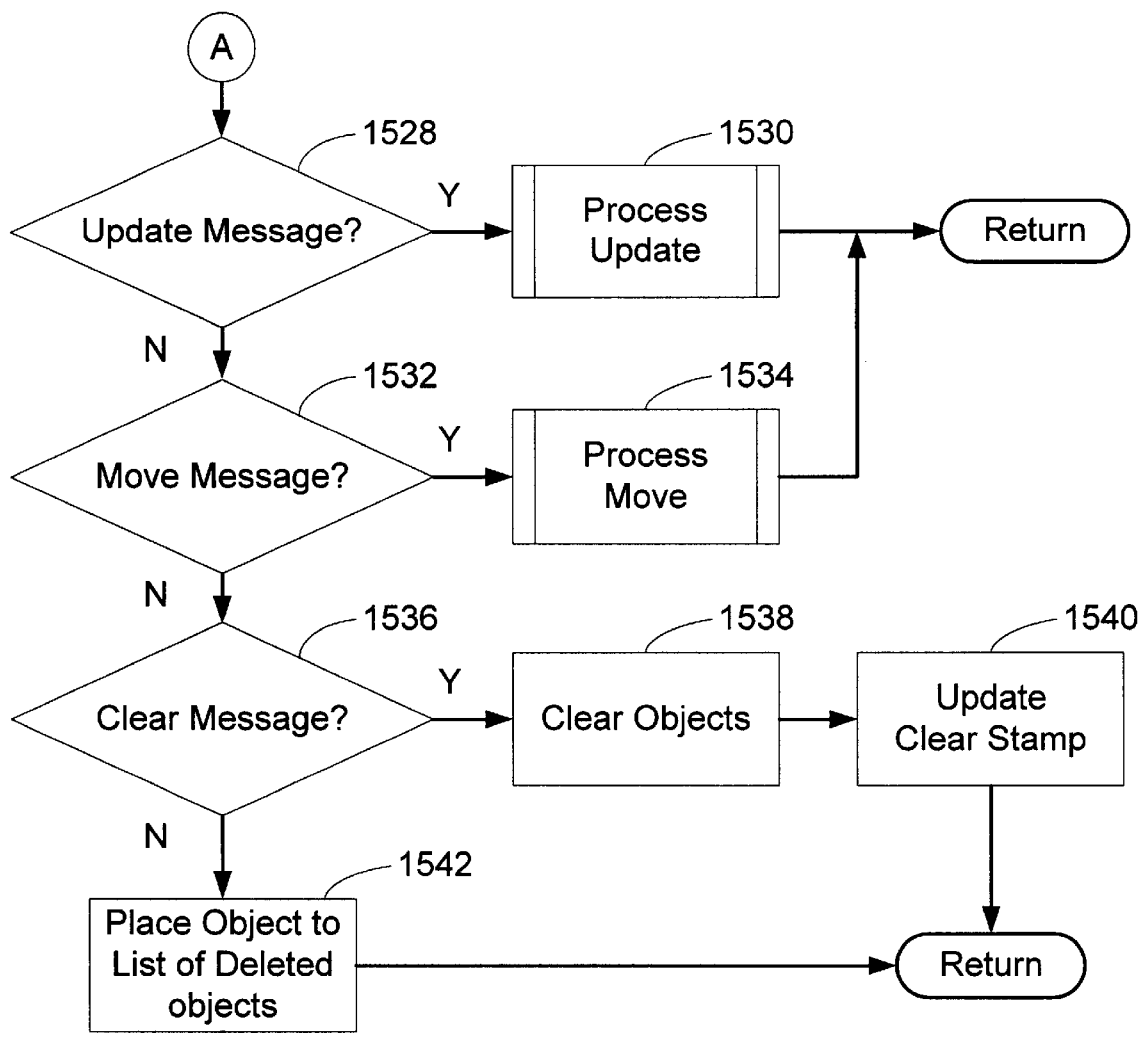

FIGS. 15A and 15B illustrate an overview flow diagram of the process operator messages routine. The process operator messages routine determines the type of action indicated by the operator message and processes the operator message. In step 1502, if the operator message was generated before a clear message was generated, then the process operator message routine continues at step 1504, otherwise the process operator message routine continues at step 1506. In step 1504, the process operator messages routine discards the operator message. In step 1506, if this operator message was generated before a delete message was generated for the object, then the process operator messages routine continues at step 1508, otherwise the process operator messages routine continues at step 1510. In step 1508, the process operator messages routine discards the operator message. In step 1510, if the operator message was generated before the last received operator message of the same type, then the process operator messages routine continues at step 1512, otherwise the process operator messages routine continues at step 1516. In step 1512, the process operator messages routine discards the operator message. In step 1516, if the operator message identifies an object that has not been added yet and it is not a replace message, then the process operator messages routine continues at step 1518, otherwise the process operator messages routine continues at step 1520. In step 1518, the process operator messages routine places the operator message back in a queue.

In step 1520, if the operator message is an add message, the process operator messages routine continues at step 1522, otherwise the process operator messages routine continues at step 1524. In step 1522, the process operator messages routine invokes the process add routine. In step 1524, if the operator message is a replace message, the process operator messages routine continues at step 1526, otherwise the process operator messages routine continues at step 1528. In step 1526, the process operator messages routine invokes a process replace routine. In step 1528, if the operator message is an update message, the process operator messages routine continues at step 1530, otherwise the process operator messages routine continues at step 1532. In step 1530, the process operator messages routine invokes a process update routine. In step 1532, if the operator message is a move message, the process operator messages routine continues at step 1534, otherwise the process operator messages routine continues at step 1536. In step 1534, the process operator messages routine invokes a process move routine. In step 1536, if the operator message is a clear message, the process operator messages routine continues at step 1538, otherwise the process operator messages routine continues at step 1542. In step 1538, the process operator messages routine clears the objects on the page specified by the object. In step 1540, the process operator messages routine updates the clear stamp. In step 1542, the process operator messages routine places the object on the list of deleted objects.

The add message identifies an object that is to be added to a page of an application section. The add message indicates whether the object is to be added to the front, middle, or back region of the set of objects on a page of an application section. In the front region, the objects are ordered by decreasing sequence numbers, with the top-most object having the highest sequence number. In the back region, the objects are ordered by increasing sequence numbers, with the bottom-most object having the highest sequence number. Objects are added to the end of the middle region. As discussed above, if the sequence identification of the add message is the same as the add stamp, an OM system will use the node identification in the message to determine whether or not to apply the operator. Also, if a replace message that was generated before the add message for the object has already been processed, the OM system discards the add message. Otherwise, the OM system adds the object to either the front, middle, or back region and updates the add stamp.

Figure 16:
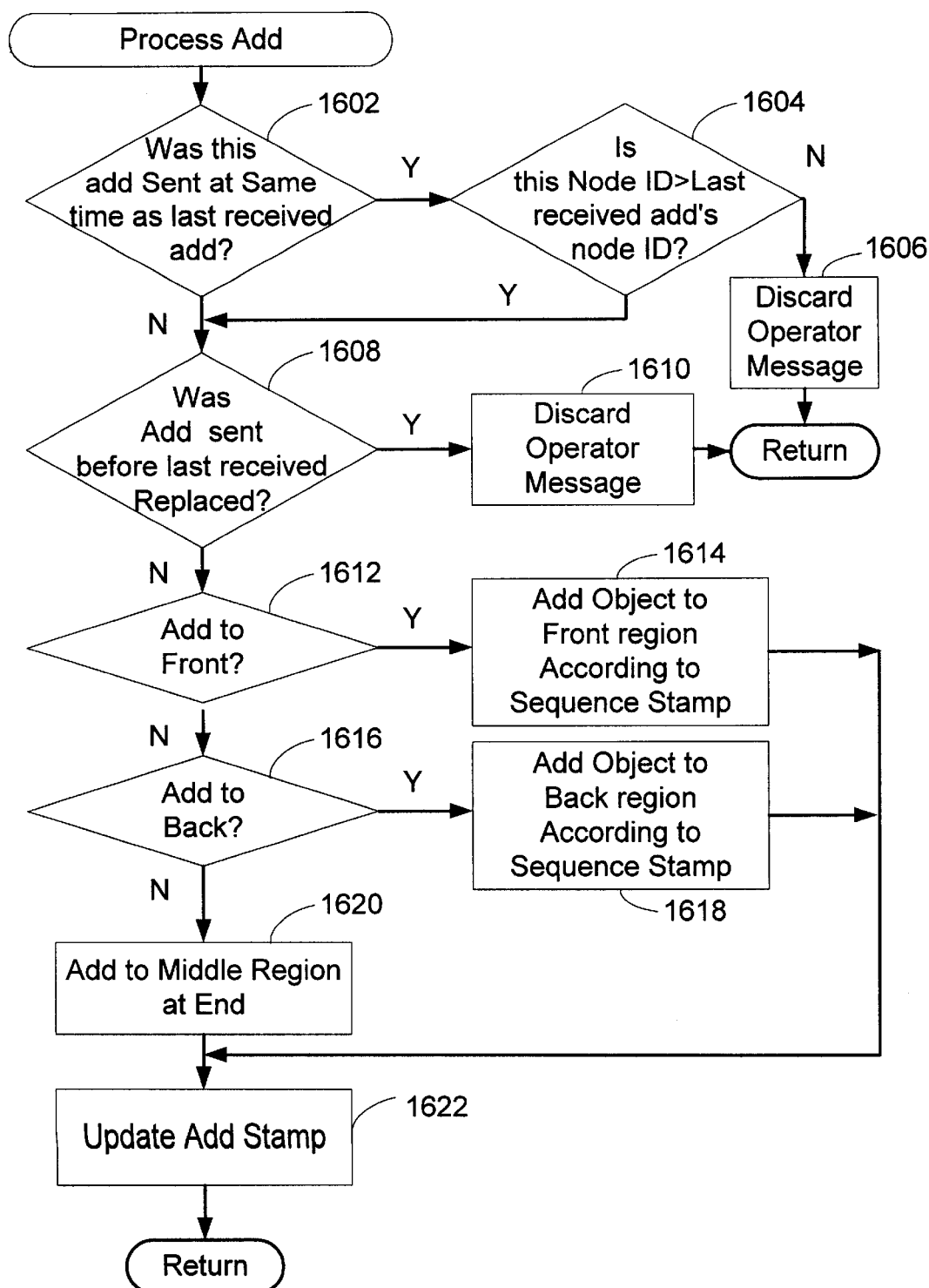
FIG. 16 illustrates an overview flow diagram of the process add routine.

FIG. 16 illustrates an overview flow diagram of the process add routine. In step 1602, if the add message was generated at the same time as the last received add message, then the process add routine continues at step 1604, otherwise the process add routine continues at step 1608. In step 1604, if the node identification of the add message is greater than the node identification of the last received add message, then the process add routine continues at step 1606, otherwise the process add routine continues at step 1608. In step 1606, the process add routine discards the operator message. In step 1608, if this add message was generated before the last received replace message, then the process add routine continues at step 1610, otherwise the process add routine continues at step 1612. In step 1610, the process add routine discards the operator message. In step 1612, if this add message indicates the object is be added to the front region, the process add routine continues at step 1614, otherwise the process add routine continues at step 1616. In step 1614, the process add routine adds the object to the front region according to its sequence stamp. In step 1616, if this add message indicates the object is to be added to the back region, the process add routine continues at step 1618, otherwise the process add routine continues at step 1620. In step 1618, the process add routine adds the object to the back region according to its sequence stamp. In step 1620, the process add routine adds the object at the end of the middle region. In step 1622, the process add routine updates the add stamp by incrementing the value by one.

The replace message replaces an entire object with another one. As discussed above, if the sequence stamp of the replace message is the same as the replace stamp, an OM system will use the node identification in the message to determine whether or not to apply the operator. The OM system can receive a replace message for an object that was generated before the last received replace message. This current replace message is then discarded. Also, if this replace message was generated before the last received update message for this object, the OM system replaces the portion of the object that was not updated. Otherwise, the OM system replaces the object and updates the replace stamp.

Figure 17:
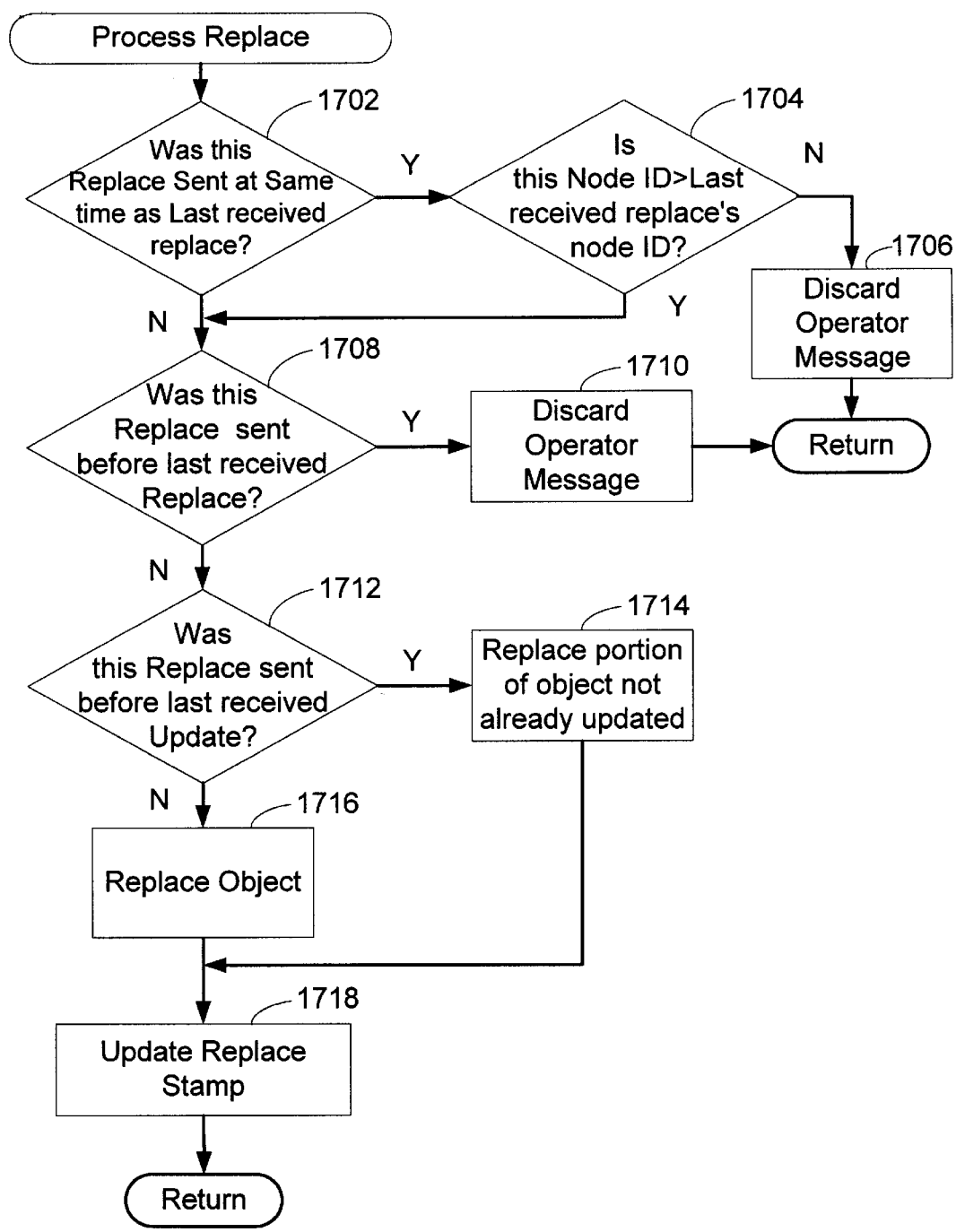
FIG. 17 illustrates an overview flow diagram of the process replace routine.

FIG. 17 illustrates an overview flow diagram of the process replace routine. In step 1702, if the replace message was generated at the same time as the last received replace message, the process replace routine continues at step 1704, otherwise the process replace routine continues at step 1708. In step 1704, if the node identification of this replace message is greater than the node identification of the last received replace message, the process replace routine continues at step 1706, otherwise the process replace routine continues at step 1708. In step 1706, the process replace routine discards the operator message. In step 1708, if the replace message was generated before the last received replace message, the process replace routine continues at step 1710, otherwise the process replace routine continues at step 1712. In step 1710, the process replace routine discards the operator message. In step 1712, if this replace message was generated before the last received update message, the process replace routine continues at step 1714, otherwise the process replace routine continues at step 1716. In step 1714, the process replace routine replaces the portion of the object not already updated. In step 1716, the process replace routine replaces the object. In step 1718, the process replace routine updates the replace stamp.

An update message will update a portion of an object. If the sequence identification of the update message is the same as the update stamp, an OM system will use the node identification in the message to determine whether or not to apply the operator. If this update message was generated before the last received update message, then the OM system recognizes that a portion of the object has already been updated and this portion should not be updated again. Therefore, the OM system updates the portion of the object not already updated. On the other hand, when the OM system receives an update message for an object that was generated before a replace message for the replace was received, the OM system recognizes that the entire object has been replaced and the update message should be discarded. Otherwise the OM system updates the object and updates the update stamp.

Figure 18:
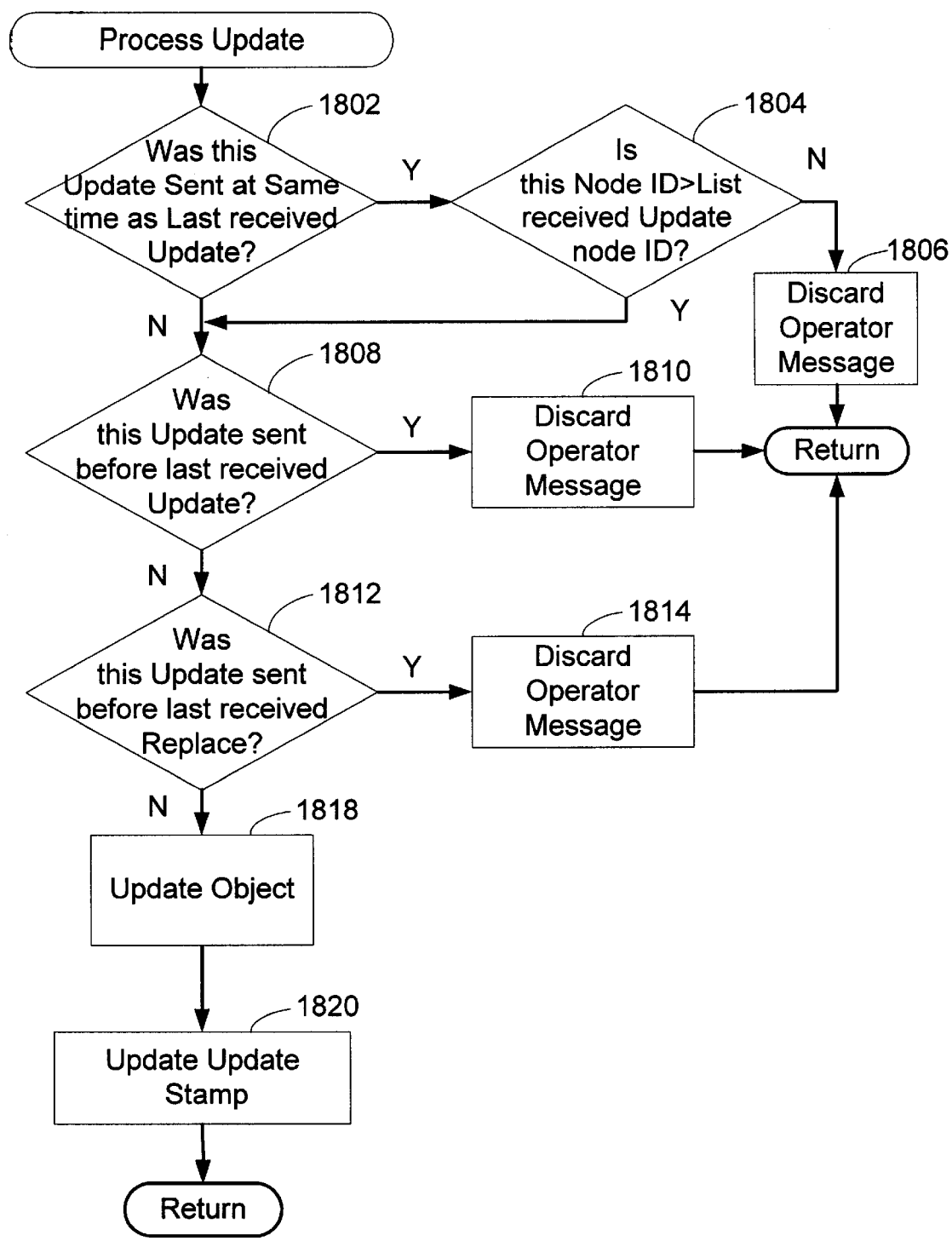
FIG. 18 illustrates an overview flow diagram of the process update routine.

FIG. 18 illustrates an overview flow diagram of the process update routine. In step 1802, if the update message was sent at the same time as the last received update message, the process update routine continues at step 1804, otherwise the process update routine continues at step 1808. In step 1804, if the node identification of the update message is greater than the node identification of the last received update message, then the process update routine continues at step 1806, otherwise the process update routine continues at step 1808. In step 1806, the process update routine discards the operator message. In step 1808, if this update message was generated before the last received update message, the process update routine continues at step 1810, otherwise the process update routine continues at step 1812. In step 1810, the process update routine updates the portion of the object not already updated. In step 1812, if this update message was generated before the last received replace message, the process update routine continues at step 1814, otherwise the process update routine continues at step 1818. In step 1814, the OM system discards the operator message. In step 1818, the process update routine updates the object. In step 1820, the process update routine updates the update stamp.

The move operator moves an object on a page by specifying that the object be moved to the front, middle or back region. If the sequence identification of the move message is the same as the move stamp, an OM system will use the node identification in the message to determine whether or not to apply the operator. Otherwise, the OM system moves the object to either the front, middle, or back region and updates the move stamp.

Figure 19:
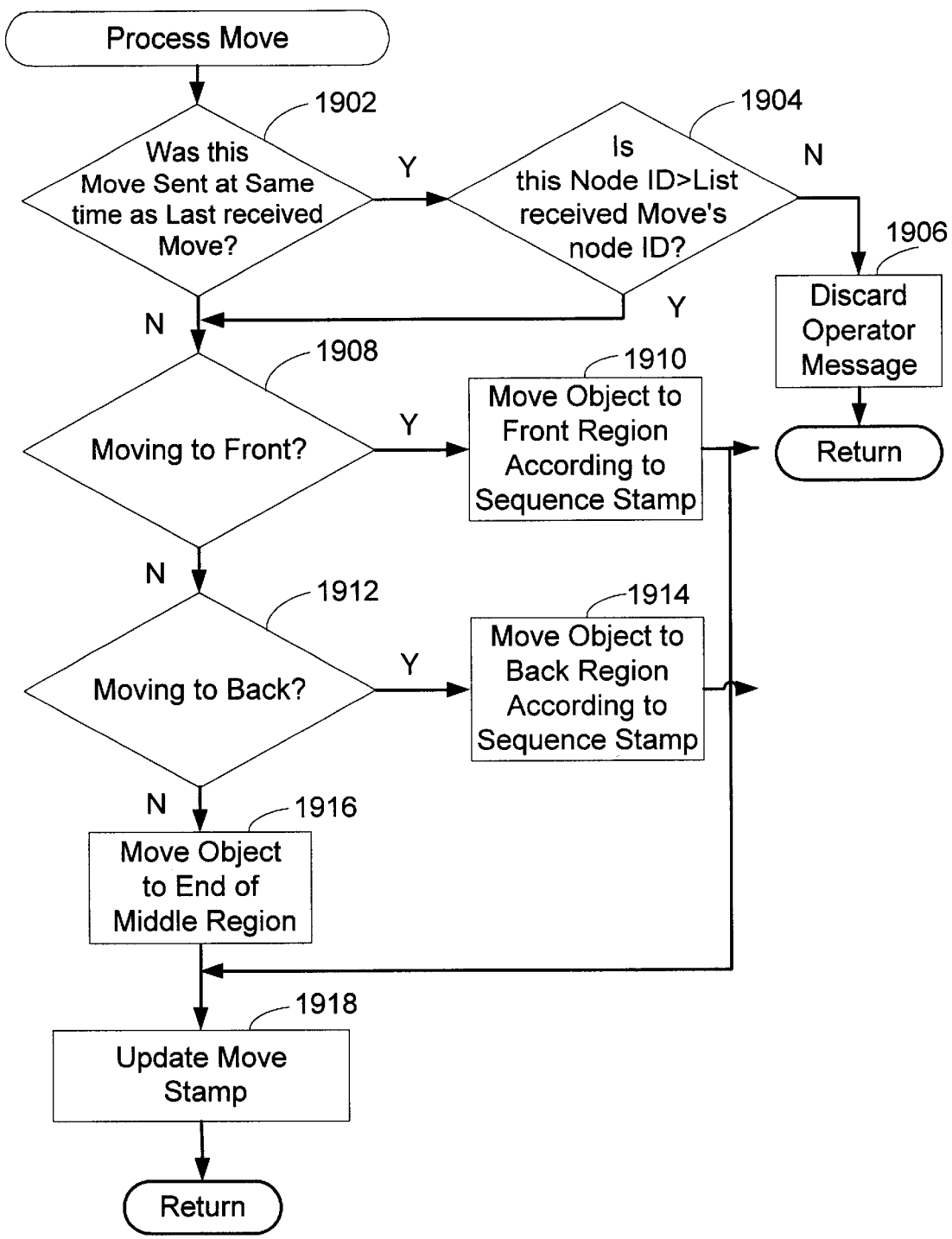
FIG. 19 illustrates an overview flow diagram of the process move routine.

FIG. 19 illustrates an overview flow diagram of the process move routine. In step 1902, if this move message was generated at the same time as the last received move message, the process move routine continues at step 1904, otherwise the process move routine continues at step 1908. In step 1904, if the node identification of the move message is greater than the node identification of the last received move message, then the process move routine continues at step 1906, otherwise the process move routine continues at step 1908. In step 1906, the process move routine discards the operator message. In step 1908, if the move message indicates the object is be added to the front region, the process move routine continues its step 1910, otherwise the process move continues at step 1912. In step 1910, the process move routine moves the object to the front region according to its sequence stamp. In step 1912, if this move message indicates the object is be added to the back region, the process move routine continues at step 1914, otherwise the process move routine continues at step 1916. In step 1914, the process move routine moves the object to the back region according to its sequence stamp. In step 1916, the process move routine moves the object to the end of the middle region. In step 1918, the process move outine updates the move stamp.

In an alternative embodiment, the present invention enables different application programs to share data in one application section. Because application programs, and not the OM system, interpret objects, any application program can use the OM system to modify objects in any application section. For example, if a Whiteboard application section has been created for the Whiteboard application program, a Microsoft Word application program can modify objects in the Whiteboard application section. In particular, the OM system can register the Microsoft Word application program with the control section. Once registered, the OM system receives and transmits operator messages for the Microsoft Word application program on the application channel assigned to the Whiteboard application section, whereby the Microsoft Word application program is able to share data with the Whiteboard application program.

In yet another alternative embodiment, the functionality of the OM system and the Call Manager system is integrated into each application program. Initially, when a user wishes to share data from an application program, the user invokes the application program to be shared and indicates that its output is to be shared. The application program interacts with the network layer to establish a Call. Then, the application program itself creates and maintains a shared data pool. Additionally, when an application program receives input from an input device indicating that a local action is to be performed on the shared data, the application program updates the application data. Next, the application program broadcasts the action to each other computer system with which it is sharing data. At each other computer system, when an application program receives the remote action (i.e., the broadcast action) that application program updates its application data.

Although the present invention has been described in terms of a preferred embodiment, it is not intended that the invention be limited by this embodiment. Modifications within the spirit of the present invention will be apparent to those skilled in the art. The scope of the present invention is defined in the claims that follow.

What is claimed is:

1. A method for adding a new computer system to a plurality of interconnected computer systems, each of the plurality of interconnected computer systems sharing an application program and having a synchronized data area, without interrupting the sharing of the application program while the new computer system acquires shared data in the synchronized data area, each of the plurality of interconnected computer systems and the new computer system further having an object management system, an input device, and an output device, the method comprising the steps of:

broadcasting a joining message to the plurality of interconnected computer systems from the object management system of the new computer system;

broadcasting, responsively to receiving the joining message, a node identification message by the object management system at each of the plurality of interconnected computer systems;

receiving from each other computer system a node identification that identifies that computer system;

selecting a particular computer system from the plurality of interconnected computer systems, by the new computer system to be a helper computer system;

sending a data message from the object management system of the new computer to the helper computer system for requesting a copy of the data in the synchronized data area;

responding to the data message reception, at the helper computer, by transmitting to the new computer system the shared data from the synchronized data area of the helper computer, the synchronized area comprising a control section and at least one application section corresponding to the shared registered application, and wherein the helper computer locks the control section in the plurality of interconnected computer systems while transmitting data from the control section.

2. The method of claim 1 wherein the new computer system during the step of selecting selects a particular computer system which first responds with a node identification message.

3. The method of claim 1, wherein each of the computer systems in the plurality of interconnected computers systems is connected to another computer system in the plurality of interconnected computer systems by a plurality of channels including a node channel, an object management channel, and an application channel.

4. The method of claim 1 wherein the new computer system uses the object management channel to broadcast the joining message.

5. The method of claim 1 wherein the new computer system transmits the data message on node channel.

6. The method of claim 1 wherein the helper computer provides the new computer system with data on the node channel.

7. The method of claim 1 wherein the operator messages are transmitted on a specific application channel corresponding to the particular application being shared.

8. The method of claim 1 wherein the helper computer locks the control section while transmitting data from the control section to the new computer system in response to receiving a data message.

9. A system for enabling a new computer system to join in sharing an application program with a plurality of interconnected computer systems, each computer system that is sharing the application program having an instance of the application program and having a synchronized data area, the system comprising;

at the new computer system, an object management system for:
- transmitting a join message to the other computer systems, indicating that the new computer system is to share the application program;
- receiving from other computer systems their respective node identification;
- selecting one of the computer systems from which a node identification has been received;
- sending a request to the selected computer system for a copy of the data in a control section of the synchronized data area;
- receiving a copy of the requested data from the selected computer system, the requested data being transmitted with the selected computer ensuring locking of the control section of the synchronized data area for the duration of the transmission to prevent changes to the control section while transmitting data; sending a request to the selected computer system for a copy of the data in an application section of the synchronized data area;
- receiving a copy of the application data from the selected computer system; and
- an instance of the application program at the new computer system for generating a display based on the received copy of the data so that the new computer system joins in the sharing of the application program.

10. A computer-readable storage medium containing computer executable instructions for carrying out the steps in a method for adding a new computer system to a plurality of interconnected computer systems, each of the plurality of interconnected computer systems sharing an application program, without interrupting the sharing of the application while the new computer system acquires the shared data, each of the plurality of interconnected computer Systems further having an object management system, an input device, an output device, an instance of the application and application data, the steps comprising of:

having the new computer system broadcast a joining message to the plurality of interconnected computers systems;

broadcasting, responsively to a reception of the joining message, a node identification message by the object management systems at the plurality of interconnected computer systems;

selecting a particular computer system from the plurality of interconnected computer system, responsively to receiving the node identification messages, by the new computer system to be a helper computer system;

transmitting a data message from the new computer system to the helper computer system for requesting a copy of data in a synchronized data area; and responding to the data message reception at the helper computer by transmitting to the new computer system the shared data from the synchronized area comprising a control section and at least one application section corresponding to the registered applications being shared while also transmitting operator messages, and wherein the helper computer locks the control section in the plurality of interconnected computer systems while transmitting data from the control section.

\* \* \* \* \*

UNITED STATES PATENT AND TRADEMARK OFFICE
CERTIFICATE OF CORRECTION

PATENT NO.    : 6,199,116 B1
DATED         : March 6, 2001
INVENTOR(S)   : Philip Jonathan May et al.

It is certified that error appears in the above-identified patent and that said Letters Patent is hereby corrected as shown below:

Title page,
Item [56], References Cited, U.S. PATENT DOCUMENTS, please add:

| -- 4,882,687 | 11/21/89 | Gordon          | 364 | 518 | 03/31/86 |
|    5,206,934 | 04/27/93 | Naef, III       | 395 | 200 | 08/15/89 |
|    5,210,825 | 05/11/93 | Kavaler         | 395 | 147 | 04/26/90 |
|    5,255,361 | 10/19/93 | Callaway et al. | 395 | 162 | 04/04/91 |
|    5,408,600 | 04/18/95 | Garfinkel et al.| 395 | 153 | 07/06/94 |
|    5,565,886 | 10/15/96 | Gibson          | 345 | 136 | 11/01/93 -- |

Column 9,
Line 44, "page from the" should read -- page the --.

Column 22,
Line 8, "Systems" should read -- systems --.

Signed and Sealed this

Ninth Day of September, 2003

JAMES E. ROGAN
*Director of the United States Patent and Trademark Office*